(12) United States Patent
Hirako et al.

(10) Patent No.: US 7,426,588 B2
(45) Date of Patent: Sep. 16, 2008

(54) STORAGE APPARATUS

(75) Inventors: Norio Hirako, Hadano (JP); Shoji Kato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 447 days.

(21) Appl. No.: 11/136,577

(22) Filed: May 25, 2005

(65) Prior Publication Data

US 2006/0140008 A1 Jun. 29, 2006

(30) Foreign Application Priority Data

Dec. 27, 2004 (JP) ............................. 2004-375453

(51) Int. Cl.
*G06F 3/00* (2006.01)
*G06F 13/28* (2006.01)
*G06F 15/167* (2006.01)

(52) U.S. Cl. ............................. 710/22; 710/26; 710/30; 709/216

(58) Field of Classification Search .................... 710/22
See application file for complete search history.

(56) References Cited

U.S. PATENT DOCUMENTS

| | | | |
|---|---|---|---|
| 5,742,792 A * | 4/1998 | Yanai et al. | 711/162 |
| 5,805,927 A * | 9/1998 | Bowes et al. | 710/23 |
| 6,496,878 B1 * | 12/2002 | Azevedo et al. | 710/22 |
| 7,058,764 B2 * | 6/2006 | Bearden | 711/129 |
| 7,143,206 B2 * | 11/2006 | Oda et al. | 710/22 |
| 2003/0144008 A1 * | 7/2003 | Rehkopf | 455/456 |
| 2003/0195991 A1 * | 10/2003 | Masel et al. | 709/251 |
| 2004/0153710 A1 * | 8/2004 | Fair | 714/4 |
| 2005/0027900 A1 * | 2/2005 | Pettey | 710/22 |
| 2006/0010260 A1 * | 1/2006 | Fung | 710/22 |

* cited by examiner

*Primary Examiner*—Niketa I. Patel
*Assistant Examiner*—Zachary K Huson
(74) *Attorney, Agent, or Firm*—Antonelli, Terry, Stout & Kraus, LLP.

(57) ABSTRACT

In a data input/output with other apparatus, a data transfer controller (DTC) of a storage controller multiprocesses a data transfer with the other apparatus by utilizing a saving/recovering operation and suppresses a load therefrom, thereby improving performance thereof. A first storage apparatus includes two DMA units in a data transfer LSI of the DTC, uses them to process one or more data transfers concurrently, uses the saving or recovering operation to a memory #3 also in one DMA unit to process the data transfer while the data transfers are switched, thereby multiprocessing a plurality of data transfers. Based on an instruction from the IOC, the DTC makes one of the DMA units recover the necessary data transfer information and data from the memory #3 and transfer the data to the memory, and concurrently the other of the DMA units, which is not processed presently, save in advance, to the memory #3, the data transfer information and the data stored in the memory.

18 Claims, 18 Drawing Sheets

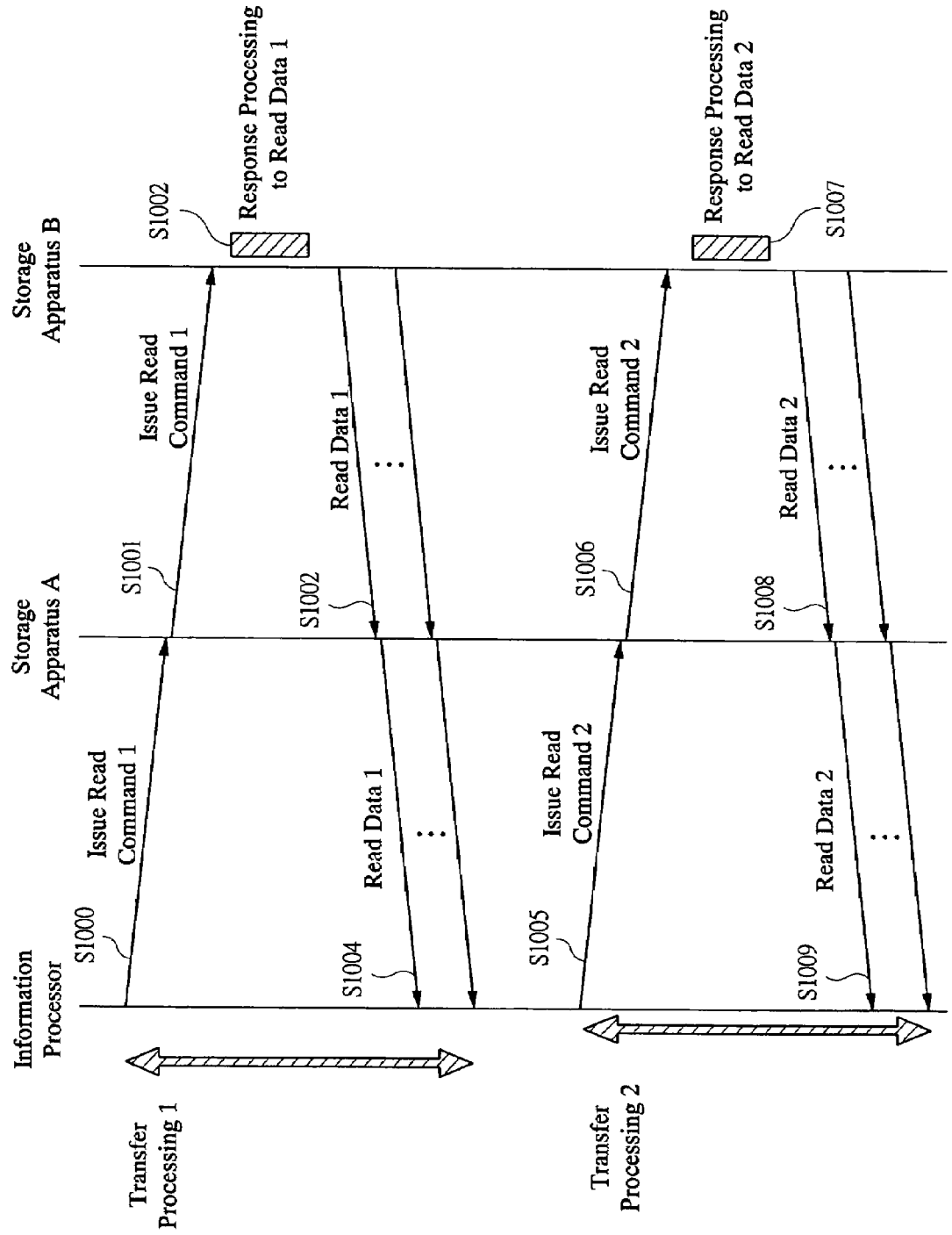

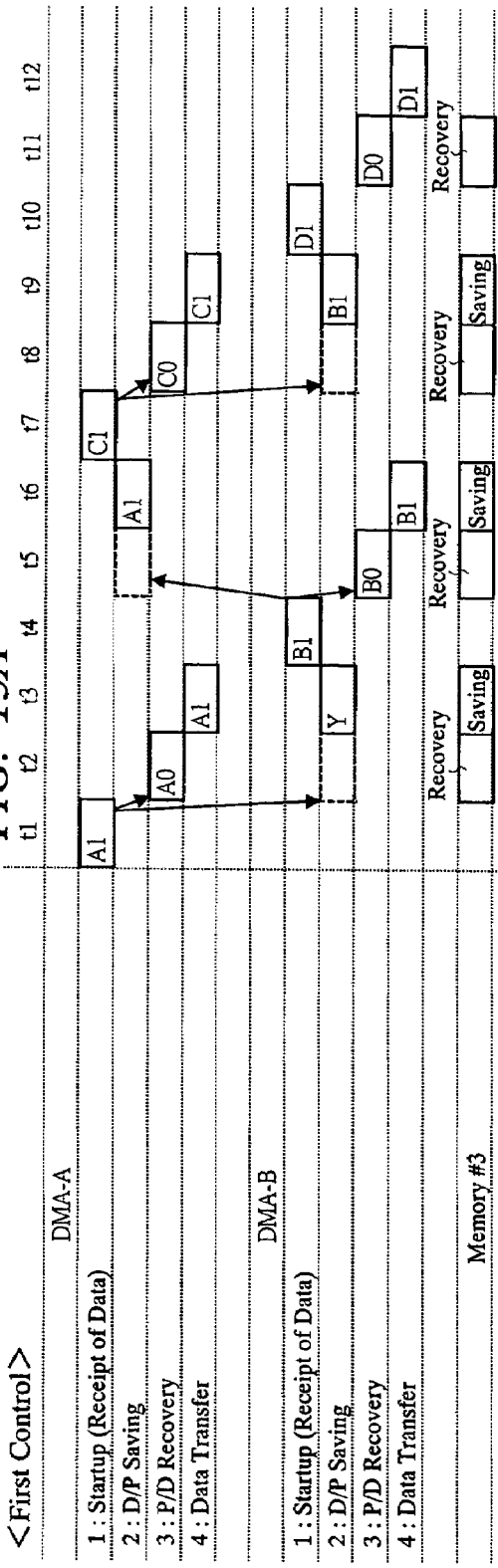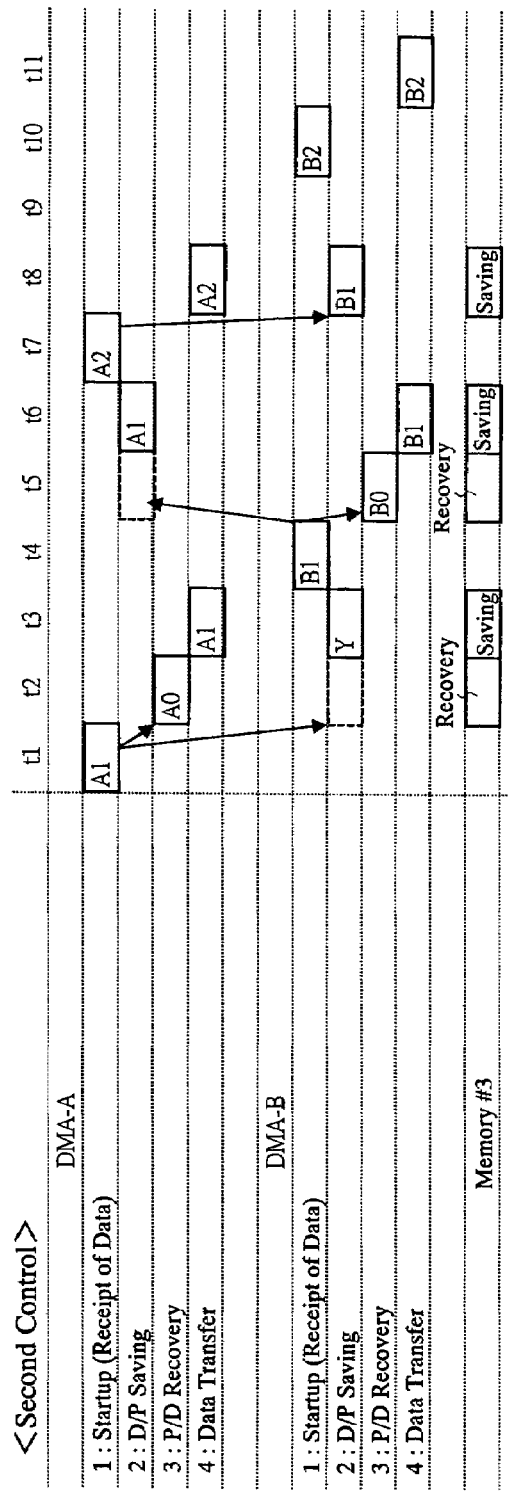

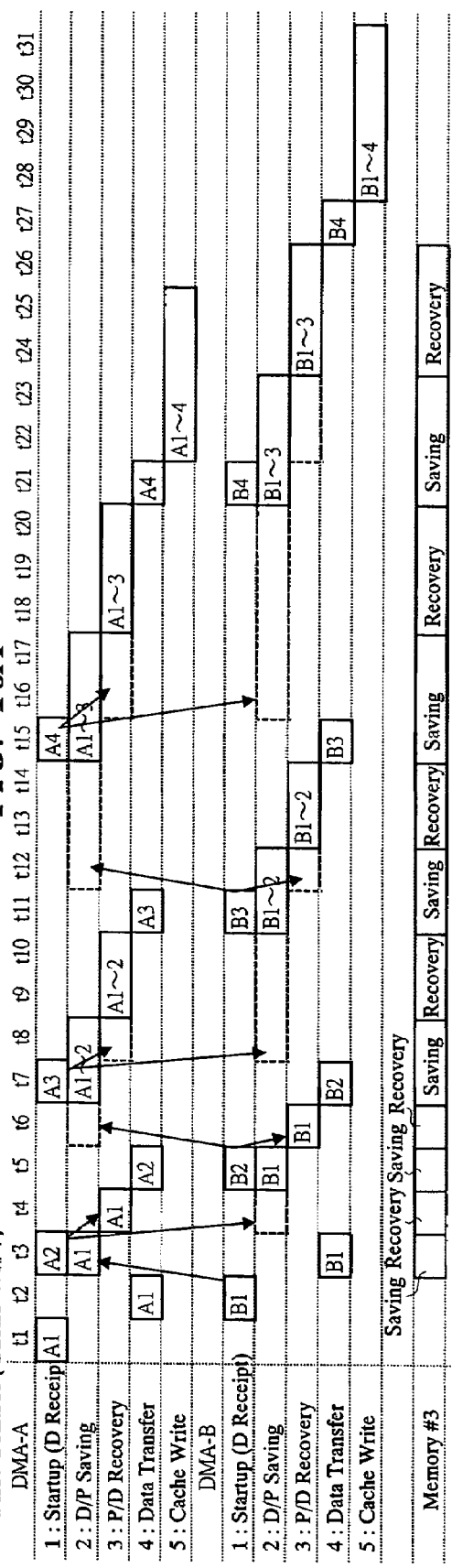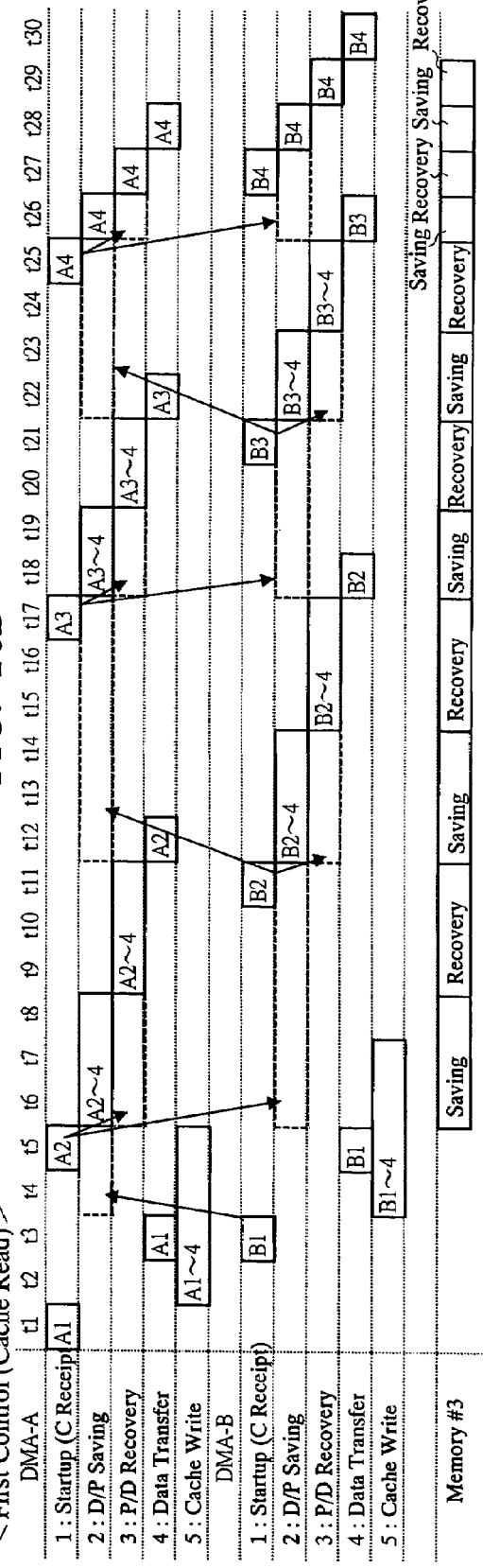

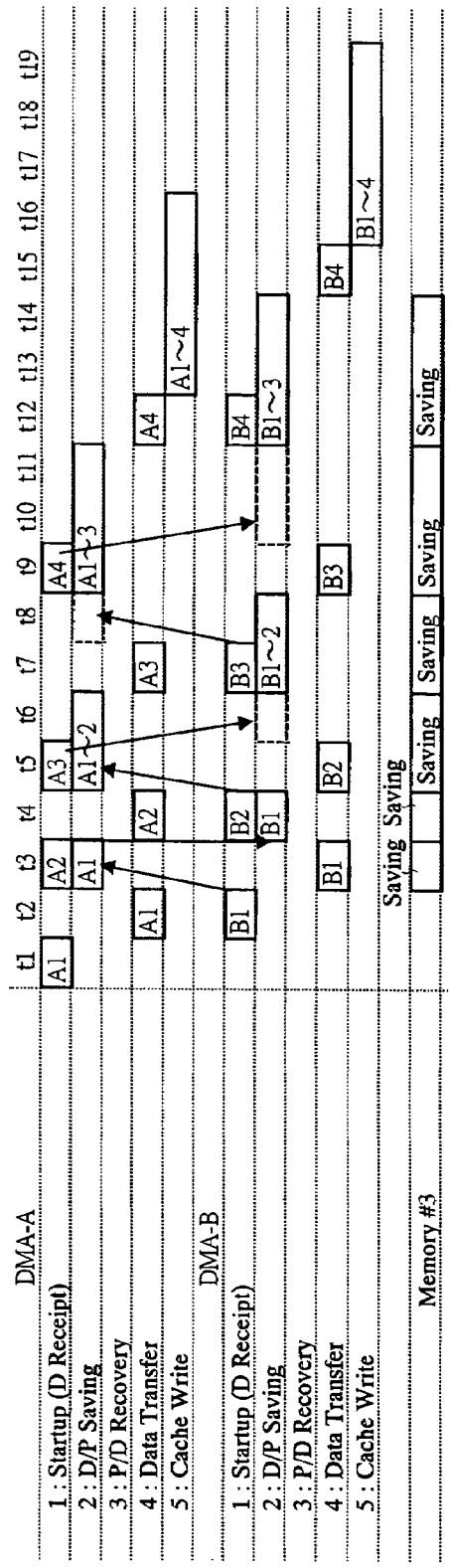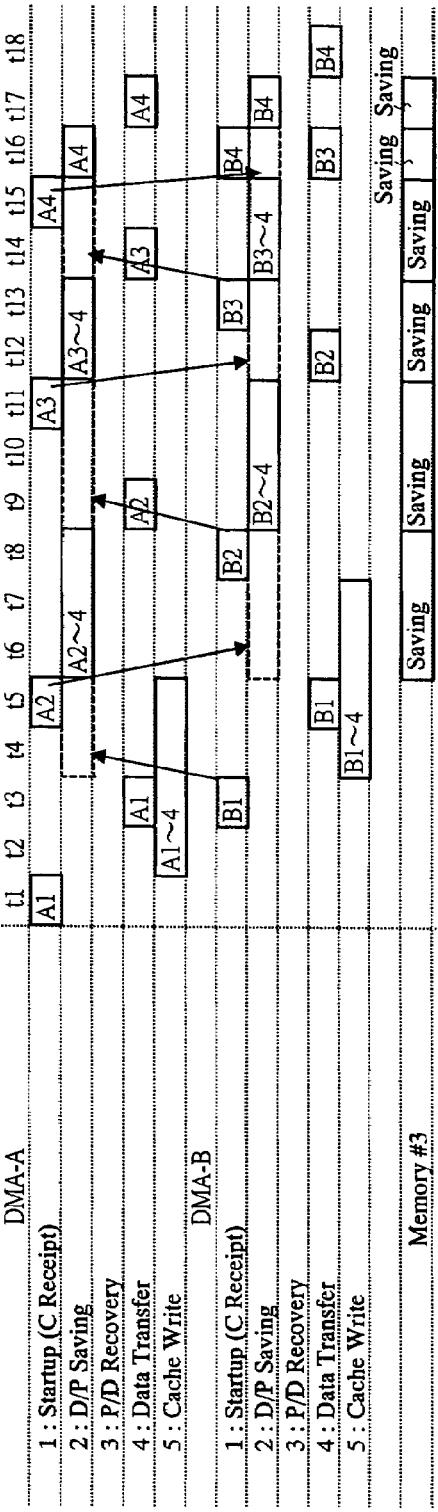

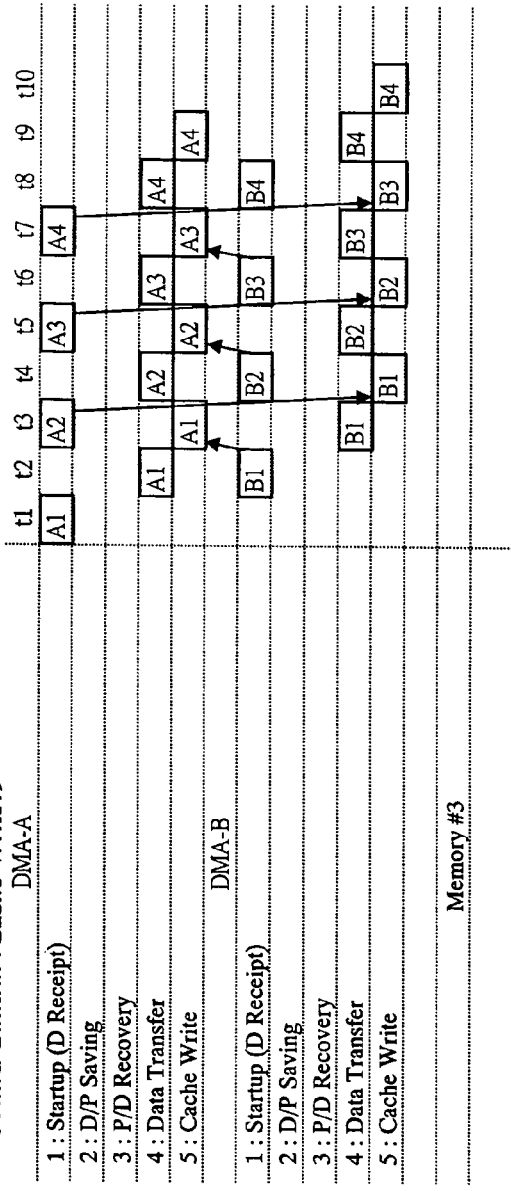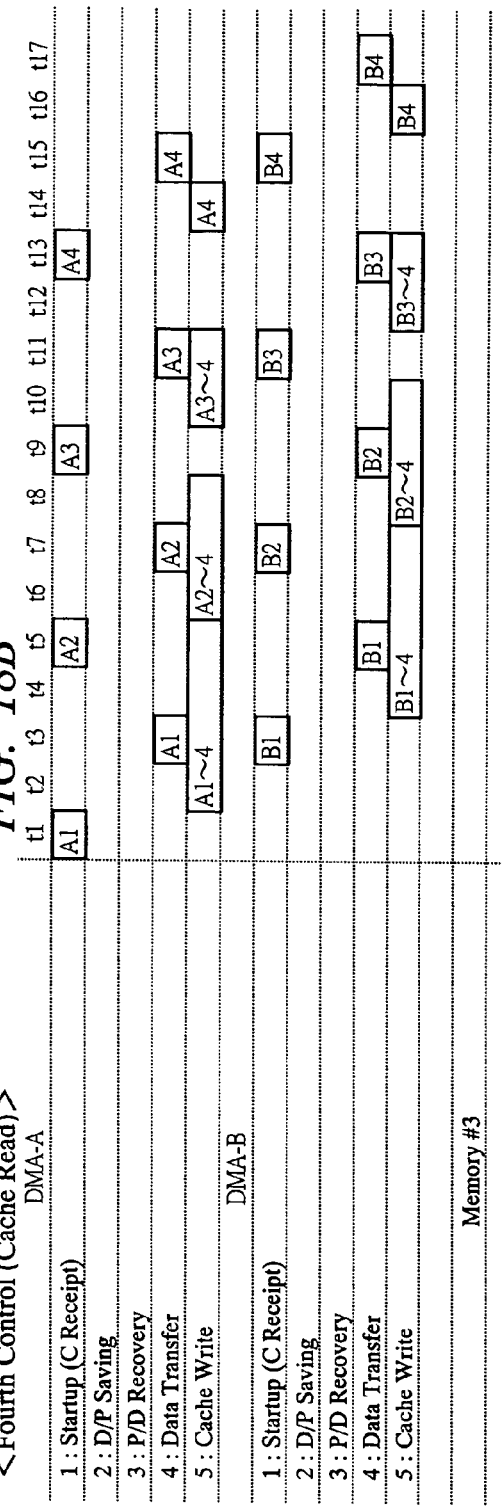

STORAGE APPARATUS

CROSS-REFERENCE TO RELATED APPLICATION

The present application claims priority from Japanese patent application No. JP 2004-375453 filed on Dec. 27, 2004, the content of which is hereby incorporated by reference into this application.

BACKGROUND OF THE INVENTION

The present invention relates to a storage apparatus (also referred to as a disk array apparatus), and, more specifically, to a technique for controlling data transfer with an information processor to be a host or with any other apparatus such as other storage apparatus.

Recently, in a technique used in the field of storage apparatuses, that is, in a configuration for communicatively connecting a plurality of storage apparatuses, a first storage apparatus receiving a data input/output request from an information processor is operated so as to access data stored in a second other storage apparatus connected communicably thereto. An example of such an operation includes a remote copy function between the storage apparatuses for implementing a disaster recovery, and a storage consolidation, etc.

U.S. Pat. No. 5,742,792 discloses a technical example of the storage apparatus in which the above operation is implemented.

SUMMARY OF THE INVENTION

In the operation, however, performance of data input/output between the first storage apparatus and the other apparatus such as the information processor or second storage apparatus is limited by communication to be established with the other apparatuses. In particular in the communication with the other apparatuses, that is, in the case of performing multiprocessing of the data transfer by a data transfer control unit (abbreviated as a DTC) of a storage controller (abbreviated as a controller), the performance of the data input/output is influenced depending on the performance of this multiprocessing.

The present invention is made in light of the problem stated above, and its object is to provide a technique for using, when the data input/output is executed between the storage apparatus and the other apparatus, inter-memory data transfer information or data save/recover operations to perform the multiprocessing of the data transfer with the other apparatus by the data transfer control unit of the controller and further for improving the performance of the data input/output by suppressing loads caused due to the above save/recover operations.

Outlines of representative ones of the inventions disclosed in the present application will be briefly described as follows. In order to achieve the object, the storage apparatus of the present invention comprises a storage unit such as a hard disk drive (HDD) and a controller for controlling storage of data to the storage unit, has a function of controlling a RAID, and is characterized by having the following technical means.

By being communicatively connected through communication means to an information processor serving as a host or any other apparatus such as other storage apparatus, the storage apparatus of the present invention has a configuration of a storage system. In the storage system, a data input/output from the information processor to the storage apparatus or a data input/output among a plurality of storage apparatuses is executed. The storage apparatus of the present invention (which is a first storage apparatus) is involved in the data input/output with the information processor or a second storage apparatus, which is other apparatus, wherein the controller multiprocesses the data transfer with the other apparatus. The data input/output is to write or read data to/from a storage volume provided on the storage unit of the first or second storage apparatus. The data transfer is a data transfer between a memory of the other apparatus and a memory of the controller.

The controller has an input/output controller (abbreviated as IOC) for controlling a data input/output, a data transfer controller (DTC) for controlling the data transfer, and a memory unit (which is a first memory unit) to be a data-transfer destination or data-transfer source. The DTC has, for example, an integrated circuit (data transfer circuit) for controlling a transfer of DMA (direct memory access) data, and a communication interface unit for performing a communication processing with the other apparatus through the communication means. The DTC is also connected to a memory unit (which is a second memory unit) used to control the data transfer. The communication interface unit has a memory unit (which is a third memory unit) used in communication. The other apparatus has a memory unit (which is a fourth memory unit) to be a data-transfer destination or data-transfer source. In the data input/output with the other apparatus, the controller controls, by the DTC, the data transfer from a data storage position in the memory unit serving as a transfer source to a data storage position in a memory unit serving as a transfer destination between the first memory unit and the fourth memory unit. For example, the first memory unit is a cache memory provided in the controller of the first storage apparatus. The fourth memory unit is a memory etc. provided in the memory of the information processor or in the controller of the second storage apparatus. Note that the first to the fourth "memory units" are set to logical memory resources while the first to the third "memories" (memory #1 to #3) are set to independent physical memory resources.

The data transfer circuit comprises at least two DMA units each having a DMA controller (DMAC) and a memory used to control the data transfer. The memory provided in the DMA unit has a register for storing the data transfer information and a buffer for storing the data. Hereinafter, "data" to be handled by the DTC corresponds to data to be transferred in the data transfer.

In the controller, the data transfer circuit forms the data transfer information with respect to the register based on an instruction from the IOC. For example, the data transfer information is created according to a script created by the IOC. The DMA unit controls, by the DMAC, the data transfer to a direction of the first or third memory unit in accordance with the data transfer information of the register while the data is stored-and-forwarded to the buffer. In addition, the data transfer circuit is connected to a memory for saving/recovering the data transfer information or data. A portion of the second memory unit corresponds to the memory for saving/recovery.

The DMA unit controls the data transfer while, for the data transfer information and the data having been stored in its own memory, the DMA unit saves, i.e., writes and/or recovers, i.e., reads the data transfer information, the data, or a pair of them to the second memory unit.

The data transfer circuit uses a plurality of DMA units to concurrently process one or more data transfer and further uses the saving/recovering operation to process the data transfer also in one DMA unit while the data transfers are switched, thereby multiprocessing the plurality of data transfers. The DTC decides which of the plurality of DMA units is in charge of the data transfer. For example, based on the instruction from the IOC, the data transfer circuit determines which of the plurality of DMA units processes the data transfer.

The IOC is composed of a first processor, for example. The communication interface unit is composed of a second memory controller, a second processor connected to the second memory controller, and a second memory, for example. The second memory unit is composed of a first memory controller, a first memory connected to the first memory controller, and a third memory connected to the data transfer circuit.

The controller is composed of, for example, a channel controller provided with a communication interface with the other apparatus, a disk controller provided with a communication interface with the storage unit, a cache memory for storing the data, a shared memory for storing the control information, and a connection unit for interconnecting them. For example, the channel controller is configured by the IOC, the DTC, and the second memory unit. The channel controller communicates with the other apparatus, and reads/writes the data from/to the cache memory. The disk controller reads/writes the data from/to the cache memory or storage volume.

In addition, as another configuration of the channel controller, the communication interface unit is composed of one protocol LSI for performing a communication processing with the other apparatus. The communication processing including a data transfer between the memory of the protocol LSI and that of the other apparatus is performed.

In the controller, the storage apparatus of the present invention executes first to fourth control for controlling the data transfer, as described below. It is configured so that each control is executed depending on a hardware configuration of the storage apparatus. It can also be configured to selectively execute one or more control. In addition, it is configured so that each control can be selectively executed depending on a processing status.

(1) As a first control of the storage apparatus of the present invention, the DTC executes control for saving in advance, into the second memory unit for future data transfer, the data transfer information, the data, or the pair thereof stored in the memory by using the DMA unit not processed presently in the data transfer. For example, the data transfer is executed by a certain DMA unit and concurrently the data transfer information and the data stored in the memory are saved in advance into the second memory unit by the other DMA unit. For example, by the DTC, the first DMA unit is made to take charge of the first data, recover the data transfer information or data required from the second memory unit, and use the recovered data transfer information and the data to execute the first data transfer. Then, due to executing the first data transfer, the DTC saves, into the second memory unit, the data transfer information or data stored in the memory of the second DMA unit. Similarly, by the DTC, the second DMA unit is made to execute a second data transfer and concurrently the first DMA unit is made to be saved in advance.

(2) As a second control of another storage apparatus of the present invention, in addition to executing advance saving in the first control, in executing the data transfer by a certain DMA unit, that is, when the data transfer information or data to be recovered remains in the saved memory of the DMA unit, the DTC uses the remaining data transfer information or data to execute the data transfer without performing the recovering operation. In sequentially executing first and second data transfers by a certain DMA unit, that is, when the second data transfer is the data input/output involved in the first data transfer, the DTC uses the data transfer information and the data stored in the memory of the DMA unit to execute the data transfer without performing the recovering operation. For example, when the plurality of data blocks that are sequential data are transferred continuously, the certain DMA unit is made by the DTC to continuously take charge of those data transfers and to use the data transfer information and the data remaining in the memory of the DMA unit to execute the data transfer without performing the recovering operation. Note that the condition that the saving operation is a copy to the second memory unit is required.

(3) As the third control in another storage apparatus of the present invention, when a cache write processing e.g., a processing of writing together the plurality of pieces of data related to the data input/output from the buffer of the DMA unit to the first memory unit is performed, the following control is executed. That is, whenever each piece of data among the plurality of pieces of data is accumulated from a side of the other apparatus to the buffer of the DMA unit, the DTC writes the data to the first memory unit, i.e., executes control for sweeping out the data into the first memory unit, without performing the saving and recovering operations to the second memory unit.

(4) As a fourth control of another storage apparatus of the present invention, for example, when the cache read processing, e.g., a processing of reading together the plurality of pieces of data related to the data input/output from the first memory unit to the buffer of the DMA unit is performed, the following control is executed. For the plurality of pieces of data, whenever each piece of data is transferred from the buffer of the DMA unit to the side of the other apparatus, the DTC uses the data re-read from the first memory unit to execute control for transferring the data to the side of the other apparatus without performing the saving and recovering operations to the second memory unit.

Effects obtained from representative ones of the inventions disclosed in the present application will be briefly described as follows. According to the present invention, when the data input/output is executed between the storage apparatus and the other apparatus, the data transfer controller of the controller uses the saving/recovering operation to the data transfer information and the data between the memories to multiprocess the data transfer between the other apparatus and the storage apparatus, and further suppresses the load from the saving/recovery, so that the performance of the data input/output can be improved.

BRIEF DESCRIPTION OF THE DRAWINGS

FIG. 8 is a sequence diagram showing a processing example of a plurality of data inputs/outputs in a conventional configuration.

FIG. 15A is a timing chart showing a processing example of first control by a storage apparatus according to a first embodiment of the present invention and second control by a storage apparatus according to a second embodiment.

FIG. 15B is a timing chart showing a processing example of first control by a storage apparatus according to a first embodiment of the present invention and second control by a storage apparatus according to a second embodiment.

FIG. 16A is a timing chart showing a processing example of the first control executed at the cache write the storage apparatus according to the first embodiment of the present invention.

FIG. 16B is a timing chart showing a processing example of the first control executed at the cache read in the storage apparatus according to the first embodiment of the present invention.

FIG. 17A is a timing chart showing a processing example of the second control executed at the cache write in the storage apparatus according to the second embodiment of the present invention.

FIG. 17B is a timing chart showing a processing example of the second control executed at the cache read in the storage apparatus according to the second embodiment of the present invention.

FIG. 18A is a timing chart showing a processing example of third control in a storage apparatus according to a third embodiment of the present invention.

FIG. 18B is a timing chart showing a processing example of fourth control in a storage apparatus according to a fourth embodiment.

DESCRIPTION OF THE PREFERRED EMBODIMENTS

Figure 1:
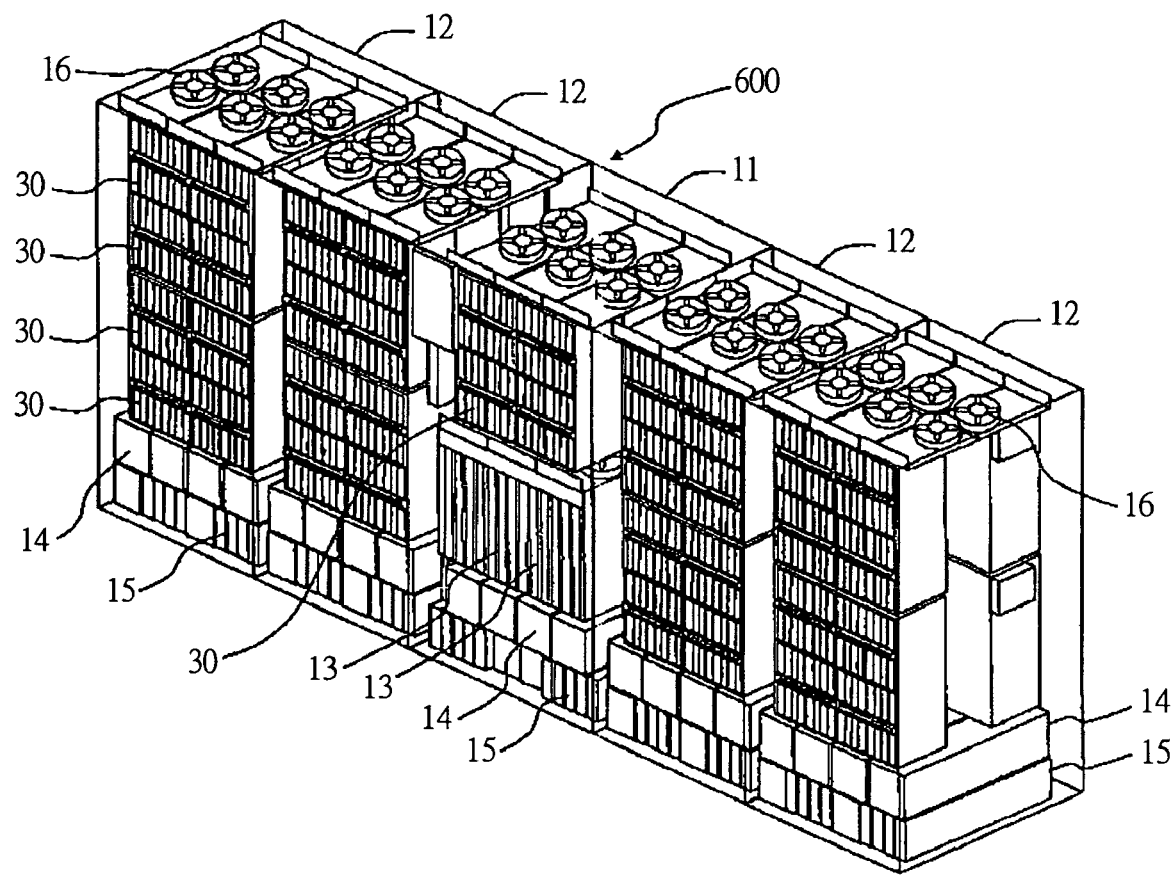
FIG. 1 is a perspective view showing an appearance configuration of entire hardware of a storage apparatus according to an embodiment of the present invention.

Hereinafter, embodiments of the present invention will be described in detail based on the drawing. Note that the same portions are denoted in principle by the same reference numeral throughout all of the drawings for describing the embodiments and repetition of the description thereof will be omitted. FIGS. 1 to 18 are views for describing storage apparatuses 600 in respective embodiments of the present invention. First, a configuration common to the respective embodiments will be explained. In the respective embodiments, hardware configurations that are basic are the same, while control theories in controllers differ.

<Hardware Configuration>

FIG. 1 is a perspective view showing an appearance configuration of overall hardware of a storage apparatus 600. The storage apparatus 600 may comprise a basic chassis 11 and a plurality of added chassis 12, for example. The basic chassis 11 is a minimum component unit of the storage apparatus 600, and includes both a control function carried by a controller 100 etc. discussed later and a storage function carried by a storage unit 30. The control function is a function to control storage of data with respect to a storage area of the storage unit 30 in accordance with an instruction or request from a host device etc. The controller 100 is configured, for example, by interconnecting control packages 13 different per function. The storage function stores data such as user data into the storage area. In this embodiment, as the storage unit 30, HDD provides the storage area. The added chassis 12 is an option unit of the storage apparatus 600 and is provided with the storage function. The added chassis 12 are controlled by a control function the basic chassis 11 has. For example, a configuration in which four added chassis 12 are connected to the basic chassis 11 is possible. The respective chassis are connected by telecommunication cables.

The basic chassis 11 is detachably provided with a plurality of control packages 13, a plurality of power-supply units 14, a plurality of battery units 15, and a plurality of storage units 30. A plurality of cooling fans 16 is also provided in an upper portion etc. of each chassis. The power-supply units 14 supply power to respective units in the chassis. The battery units 15 serve as a backup power supply. The cooling fans 16 cool down insides of the chassis. The storage unit 30 is a unit for storing data in a disk area and also has a mechanical structure for being mounted on the chassis. In the added chassis 12, a number of storage units 30 can be mounted in parallel.

The control packages 13 are modules that implement respective functions of a channel controller 110 discussed later and the like. The control package 13 is a unit provided with a mechanical structure for mounting the chassis on a board into which the functions have been incorporated. The basic chassis 11 is detachably provided with a plurality of CHA packages, a plurality of DKA packages, and one or more memory packages, etc., respectively, which can be replaced in units of the control package 13. Each control package 13 is inserted in a slot provided in the chassis, and connected to a backplane board for interconnecting respective portions in the slot.

<Storage System Configuration>

Figure 2:
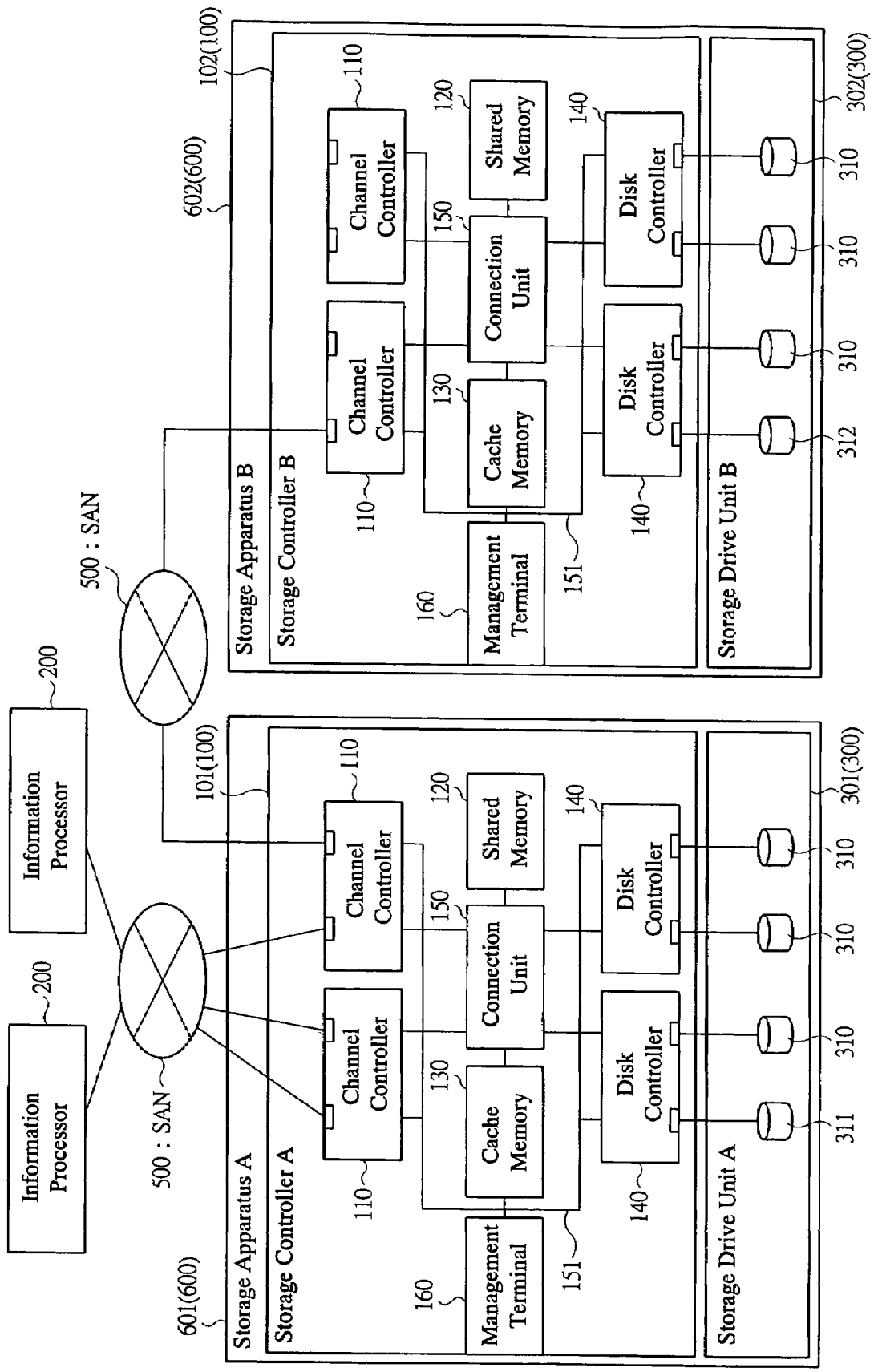
FIG. 2 is a block diagram showing an overall configuration of a storage system that includes the storage apparatus according to the embodiment of the present invention.

FIG. 2 is a block diagram showing an overall configuration of a storage system that includes the storage apparatus 600. This storage system has a first storage apparatus (A) 601 serving as the storage apparatus 600 and a second storage apparatus (B) 602, wherein the first storage apparatus 601 is communicatively connected to the information processor 200 via a SAN 500. Also, the first storage apparatus 601 is communicatively connected to the second storage apparatus 602 via the SAN 500.

The first storage apparatus 601 is configured by a first storage controller (controller) (A) 101 and a first storage drive unit (hereinafter referred to as a drive unit) (A) 301. The second storage apparatus (B) 602 is configured by a second controller (B) 102 and a second drive unit (B) 302. The respective controllers and drive units may have the same function or have different functions, although they have the same functions in this embodiment. If the first and second storage apparatuses 601, 602, the controllers 101, 102, and the drive units 301, 302 are described below without identifying them, they will be designated as the storage apparatus 600, the controllers 100, and the drive units 300.

The information processor 200 is a device such as a computer provided with a CPU, a memory, or the like, and is a host computer that makes an access of data input/output to the first storage apparatus 601. For example, the information processor 200 is a host computer having the form of a PC, a workstation, a server, or a mainframe computer. The information processor 200 implements various functions as a host computer when a wide variety of programs are executed by the CPU. The information processor 200 includes: software (referred to as a control program) for making the access of the data input/output to the first storage apparatus 601; and an application program for providing an information processing service by utilizing the access to the first storage apparatus 601. The input/output data to/from the information processor 200 is stored in storage volumes 310 in the first storage apparatus 601 or the second storage apparatus 602.

The controller 101 receives a data input/output request from the information processor 200 and performs a data input/output processing to a first storage volume 311 for storing data, which the drive unit 301 has. The controller 102 is communicably connected to the controller 101 and performs a data input/output processing to a second storage volume 312 for storing data, which the drive unit 302 has. If the first and the second storage volumes 311, 312 are described without identifying them, they will be simply designated as the storage volumes 310.

The storage volume 310 refers to a storage resource for storing the data including a physical volume that is a physical storage area to be provided by the storage unit 30 such as HDD and a logical volume that is a storage area logically set on the physical volume. The logical volume is below referred to as a LU (logical unit).

The controller 101 is communicatively connected to the information processor 200 via the SAN 500. The communication through the SAN 500 is established in accordance with a fiber channel (FC) protocol, for example. The information processor 200 and the controller 601 are provided with functions to establish communication over the SAN 500 in accordance with the FC protocol. The information processor 200 transmits a data input/output request to the first storage apparatus 601 in accordance with the FC protocol.

Also, the controller 101 is communicatively connected to the controller 102 via the SAN 500. Also in this case, the communication through the SAN 500 is established in accordance with the FC protocol, for example. The controller 601 and the controller 602 are provided with functions to establish communication over the SAN 500 in accordance with the FC protocol, and a data input/output request may be transmitted between the controllers 100 in accordance with the FC protocol.

The SAN 500 is composed of, for example, communication equipment having at least one or more switch compatible with the FC protocol. In addition, when the communication is established in accordance with the FC protocol, data to be transmitted/received is divided into two or more than data blocks per predetermined data length (e.g., 2 kb), whereby the communication is controlled in units of the data block. Furthermore, the SAN 500 connecting the information processor 200 and the controller 101 may be an identical network having been communicably connected or another network having not been communicably connected. In addition, it may be communicatively connected by using any communication means other than the SAN 500 and the FC protocol. For example, the communication between the information processor 200 and the controller 101 may be established by using a mainframe-base protocol such as FICON (Fibre Connection) (registered trademark) or ESCON (Enterprise System Connection) (registered trademark) or a protocol such as a TCP/IP used over the Internet etc. Further, it may be communicatively connected independently by using a plurality of different communication means.

The second storage apparatus 602 can be placed in a site remote from the first storage apparatus 601. In this case, by adopting such a configuration that remote copying can be executed between the first and second storage apparatuses 601, 602, even when the data stored in the first storage apparatus is lost or is not writable due to any disaster, the information processing service by the information processor 200 can be continuously provided by using the data stored in the second storage apparatus 602. The remote copying means to store, in the second storage apparatus 602, a duplicate of the data stored in the first storage apparatus 601 by controlling a copying pair of the storage volume 310 or means a technique thereof. In this case, in order to make two pieces of data stored in the first and second storage apparatuses 601, 602 coincide with each other, when the information processor 200 writes data into the storage volume 310 of the first storage apparatus 601, a duplicate of the written data is transmitted from the first storage apparatus 601 to the second storage apparatus 602. Then, the second storage apparatus 602 stores the duplicate of the written data in the storage volume 310 for duplication in the drive unit 302. The control of the copying pair is a well-known technique.

In addition, the storage consolidation becomes feasible by communicatively connecting the first and second storage apparatuses 601, 602. The storage consolidation is a technique for integrating and controlling data stored discretely in the storage apparatus 600 in order to effectively utilize a large amount of data accumulated dispersedly in the plurality of storage apparatuses 600. By this reason, for example, when the first storage apparatus 601 is newly introduced into the system, the old second storage apparatus 602 having been used until then is used as it is, whereby the large amount of data accumulated in the past can be effectively utilized. Also, the data stored in the respective storage apparatuses 600 by different makers can be integrated and controlled. In this case, by transmitting the data input/output request to the first storage apparatus 601, the information processor 200 can access the data stored in the second storage apparatus 602 as well as that in the first storage apparatus 601.

Note that although the storage system shown in this embodiment is configured to have one first storage apparatus 601 and one second storage apparatus 602, it may also be configured to have a plurality of first ones and a plurality of second ones.

The drive unit 300 includes a number of storage units 30. For this reason, the storage apparatus 600 provides a large-capacity storage area to the information processor 200. As the storage unit 30, the drive unit 300 can configure a disk array by using, for example, a plurality of disk drives. In this case, the storage area provided to the information processor 200 may be provided by a disk array executed in the form of RAID (also called a RAID group).

A unique identifier (also called LUN (LU Number)) is assigned to each of the storage volumes 310. In the data input/output request to the first storage apparatus 601 from the information processor 200, the LUN for specifying a data storage area is described. The first storage apparatus 601 has a function to provide the information processor 200 with the storage area specified by the LUN.

Between the controller 100 and the drive unit 300, the form of direct connection may be adopted as shown in FIG. 2 or the form of being connected through a network may be adopted. Further, another form in which the drive unit 300 is integrally configured with the controller 100 may be adopted.

<Controller>

The controller 100 is configured by channel controllers (abbreviated as CHAs) 110, a shared memory (abbreviated as SM) 120, a cache memory (abbreviated as CM) 130, disk controllers (abbreviated as DKAs) 140, a connection unit 150, and a management terminal (SVP) 160. Each unit is implemented by one or more unitized circuit board, for example.

The CHA 110 includes a communication interface for communicating with other apparatuses such as the information processor 200 and other storage apparatuses 600, and has such a function that data input/output requests or data can be transmitted/received between the other apparatuses and the processing unit in the controller 100. One or more CHA 110 corresponding to the communication interface may be prepared and used. The information processor 200 and/or the second storage apparatus 602 are referred to as other apparatuses 700 with respect to the first storage apparatus 601.

The DKA 140 writes/reads the data stored in the storage volume 310 that the drive unit 300 has. For example, in accordance with the data write request received by the CHA 100 from the information processor 200, the DKA 140 writes the data to the drive unit 300. One or more DKAs 140 each having the same function can be prepared and used.

Each CHA 110 and each DKA 140 are connected through an internal LAN 151 together with the management terminal 160. Therefore, a program etc. executed in each CHA 110 or/and each DKA 140 can be transmitted from and installed in the management terminal 160.

A connection unit 150 interconnects the CHA 110, SM 120, CM 130, and DKA 140 and is composed of a high-speed crossbar switch, for example. Data and/or commands are sent/received among the CHA 110, SM 120, CM 130, and DKA 140 through the connection unit 150.

The SM 120 and CM 130 are memories shared and used by the CHA 110 and DKA 140. The SM 120 is mainly used to store control information and commands, etc. The CM 130 is mainly used to store data (including data inputted/outputted from the information processor 200). The SM 120 and CM 130 are configured to have circuit boards in which the memories for storing data/information are formed, for example.

The data input/output processing by the storage apparatus 600 is performed, for example, by the following stream. If a data input/output request received by a certain CHA 110 from the information processor 200 is a data-write request, the CHA 110 writes not only the data-write request to the SM 120 but also the written data received from the information processor 200 to the CM 130. Meanwhile, when the DKA 140 monitors the SM 120 and detects that the data-write request has been written in the SM 120, it reads the written data from the CM 130 in accordance with the data-write request and writes it in the drive unit 300. In addition, if the data input/output request received by a certain CHA 110 from the information processor 200 is a data-read request, the relevant CHA 110 checks whether the data to be a reading object exists in the CM 130. Then, if the above data exists in the CM 130, the CHA 110 transmits the data to the information processor 200. Meanwhile, if the above data does not exist in the CM 130, the CHA 110 writes the data-read request to the SM 120 and concurrently monitors the SM 120. The DKA 140, which detects that the data-read request has been written in the SM 120, reads the data to be a reading object from the drive unit 300 and writes it to the CM 130 and concurrently writes the effect thereof to the SM 120. Then, when detecting that the data to be a reading object has been written to the CM 130, the CHA 110 transmits the data to the information processor 200. Thus, the data is sent/received between the CHA 110 and the DKA 140 through the CM 130. Note that a configuration of integrally forming the CM 130 and SM 120 may be adopted.

In the CM 130, data to be sent/received between the first controller 101 and at least one of the information processor 200 and the second controller 102 is stored. For example, if the first storage apparatus 601 receives, from the information processor 200, the data-write request and the written data with respect to the second storage apparatus 602, the CHA 110 in the controller 101 stores the relevant data-write request and written data in the CM 130 and transmits them to the second controller 102. Then, in accordance with the received data-write request, the second controller 102 writes the written data into the second drive unit 302. In addition, if the first storage apparatus 601 receives, from the information processor 200, the data-write request and the written data with respect to the first drive unit 301 and when the written data is remote-copied to the second storage apparatus 602, the CHA 110 of the first controller 101 transmits the written data stored in the CM 130 to the second controller 102. Then, the second controller 102 writes the received written data into the second drive unit 302.

Note that instead of indirectly making an instruction to write or read the data from the CHA 110 to the DKA 140 by interposing the presence of the SM 120, for example, a configuration of directly making the above instruction without interposing the SM 120 may be adopted. Furthermore, by providing the CHA 110 with a function of the DKA 140, the CHA 110 may write/read the data stored in the drive unit 300.

In addition, although the configuration of independently providing the SM 120 and CM 130 to the CHA 110 and DKA 140 is adopted, this embodiment is not limited to this configuration and a configuration in which the SM 120 or CM 130 is dispersedly provided in each of the CHA 110 and DKA 140 can be adopted preferably. In this case, the connection unit 150 interconnects the CHA 110 and DKA 140, each of which has the dispersed SM 120 or CM 130.

<Information Processor>

The information processor 200 includes a CPU, a memory, a port, a recording medium reader, an input device, an output device, and a storage unit, etc. The CPU controls the entirety thereof and executes programs stored in the memory to implement various functions. Since the CPU executes the application program, various information processing services such as an automatic cash dispenser service and an automatic teller service of a bank are provided. In addition, since the CPU executes the control program, management of the storage volumes 310 to be handled by the storage apparatus 600 is controlled. For example, a command to make the first storage volume 311 in the first drive unit 301 and the second storage volume 312 in the second drive unit 302 correspond to each other and to write the data into the first storage volume 311 and thereafter write a duplicate of the data to the second storage volume 312 can be transmitted to the controller 101. In addition, the LUN of the storage volume 310 can be also set.

The recording media reader is incorporated in or provided outside the information processor 200 and reads any program or data recorded in a recording medium. The read program or data is stored in the above memory or storage unit. For example, the control program or application program stored in the recording medium can be read and stored in the memory by the recording media reader. In addition, a program can be received through the port from another information processor 200 and stored in the memory. The recording medium may be a flexible disk, a CD, or a semiconductor memory, etc. The storage unit is a HDD or semiconductor storage device, for example. The input device is a keyboard or mouse, etc. for an operator to input data etc. The output device is a display or printer, etc. for outputting data externally, for example. The port is one for communicating with the storage apparatus 600 and another information processor 200, etc., and is connected to the SAN 500 in this embodiment, thereby being capable of communicating with the controller 101. Note that, as a well-known technique in the FC, an identifier WWN (World Wide Name) that specifies any equipment over the SAN 500 is assigned to the port.

<Management Terminal (SVP)>

The management terminal 160 is a computer for maintaining/managing the storage apparatus 600. By operating the management terminal 160, for example, setting of the physical disk in the drive unit 300, setting of the LU, installation of the program executed by the CHA 110 or DKA 140, and the like become possible. The management terminal 160 may have the form of being incorporated in or provided outside the controller 100. In addition, the management terminal 160 can have the form of a computer dedicated for maintenance/management of the controller 100 and the drive unit 300 or of a general computer equipped with a maintenance/management function. Similarly to the information processor 200, the management terminal 160 includes a CPU, a memory, a port, a recording media reader, an input device, an output device, and a storage unit, etc. The CPU controls the entirety thereof and executes the programs stored in the memory to implement the maintenance/management function. The above port is connected to an internal LAN 151, thereby enabling to communicate with the CHA 110 or DKA 140.

<DKA>

The DKA 140 follows a conventional configuration and will be described briefly. The DKA 140 includes an interface unit, a memory, a CPU, a NVRAM (Non-volatile RAM), and a connector, etc. wherein they are formed as an integral unit on one or more circuit board similarly to the CHA 110. The interface unit includes a communication interface for communicating with the CHA 110 etc. through the connection unit 150, and a communication interface for communicating with the drive unit 300. The CPU controls the entirety of the circuit boards configuring the DKA 140 and concurrently establishes communication between the CHA 110 and the drive unit 300 or management terminal 160. The CPU executes various programs stored in the memory and NVRAM, whereby the function as the DKA 140 is implemented. The function of the DKA 140 includes control of reading/writing of the data stored in the drive unit 300, RAID control over the RAID group, and the like. The NVRAM stores the control program etc. and can write or rewrite the data from the management terminal 160.

<Configuration Related to Data Input/Output>

Figure 3:
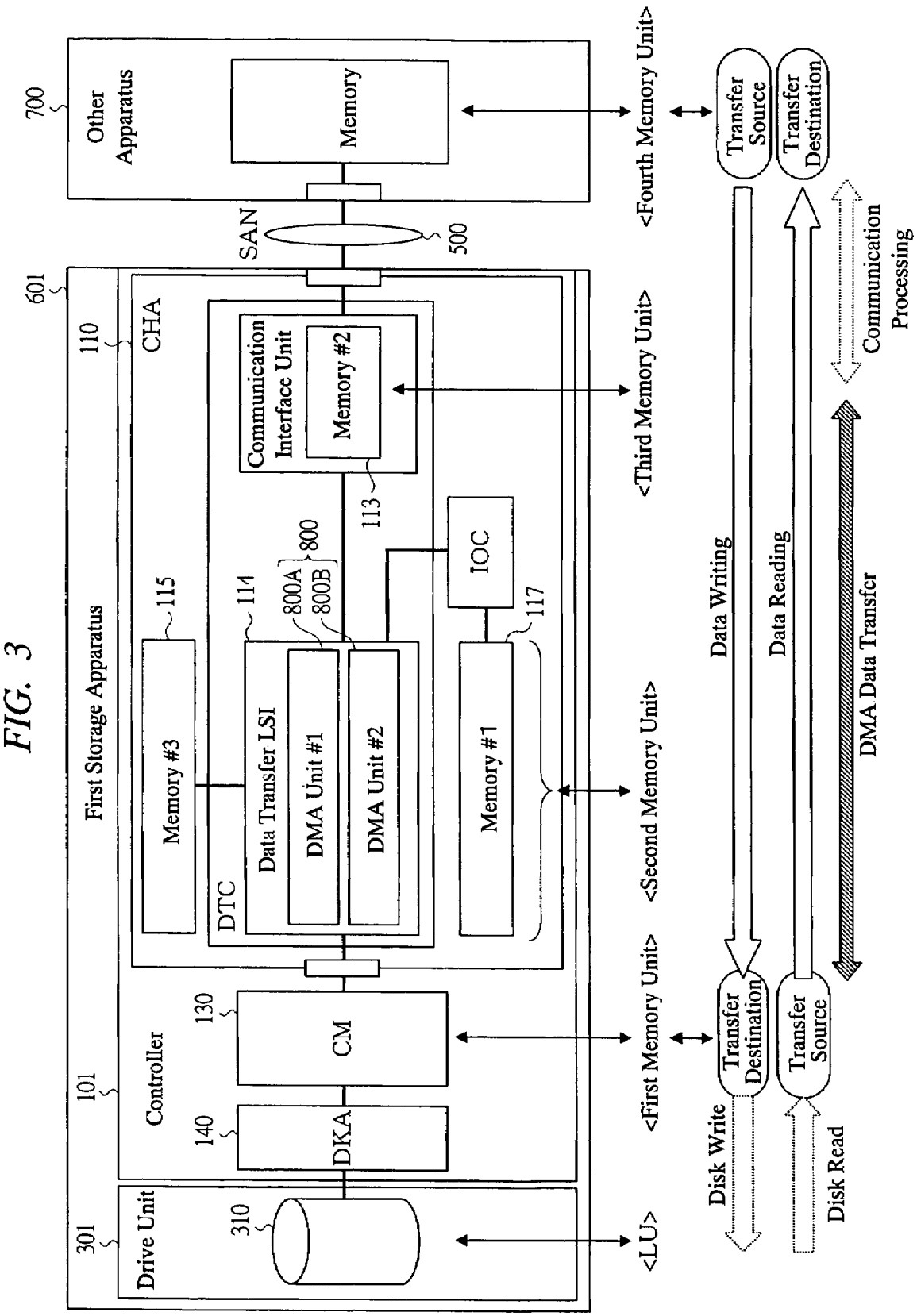
FIG. 3 is a view showing a configuration outline, which executes data input/output between a first storage apparatus according to the embodiment of the present invention and other apparatuses, and summarizing processors and memory units mainly performing the data transfer.

FIG. 3 shows outlines of a configuration related to data input/output between the first storage apparatus 601 and the other apparatus 700, and summarizes a processor and a memory unit mainly performing the data transfer. It shows one logical connection path. As the data input/output, there are data writing and data reading to the storage volume 310 of the first storage apparatus 601 from the other apparatus 700. In the data-write processing, the data transfer in which a memory of the other apparatus 700 is set as a transfer source and the CM 130 of the controller 100 is set as a transfer destination is performed, while in the data-read processing, the data transfer in which the CM 130 is set as a transfer source and the memory of the other apparatus 700 is set as a transfer destination is performed. The storage volume 310 corresponds to the LU etc.

The CHA 110 has an IOC that controls the data input/output, a data transfer LSI 114, and a communication interface unit, and further has a DTC controlling the data transfer between the CM 130 and the other apparatus 700, a memory #1 (117), and a memory #3 (115), etc. The communication interface unit has a memory #2 (113). The DKA 140 performs the data transfer between the CM 130 and the storage volume 310 of the drive unit 300. Data is transferred through the SAN 500 between the communication interface unit and the other apparatus 700. The data transfer LSI 114 has at least two DMA units #1 (800A) and #2 (800B). Unless their DMA units are distinguished, they will be referred to as a DMA unit 800. The data transfer LSI 114 controls a DMA data transfer between the CM 130 and the memory #2 (113) in the communication interface unit by the DMA unit 800.

In addition, in this embodiment, there are a plurality of memory units used for performing the data transfer. Then, in the controller 100, the CM 130 is abbreviated as a first memory unit, the memory #1 (117) and the memory #3 (115) used by the data transfer LSI 114 are abbreviated as a second memory unit, the memory #2 (113) used by the communication interface unit is abbreviated as a third memory unit, and the memory in the other apparatus 700 is abbreviated as a fourth memory unit.

By using the data transfer LSI and the second memory unit, the DTC performs the DMA data transfer between the first memory unit and the third memory unit. The communication interface unit performs a communication processing between the third memory unit and the fourth memory unit. The DKA 140 executes disk writing and disk reading from the first memory unit to the LU.

<First CHA>

Figure 4:
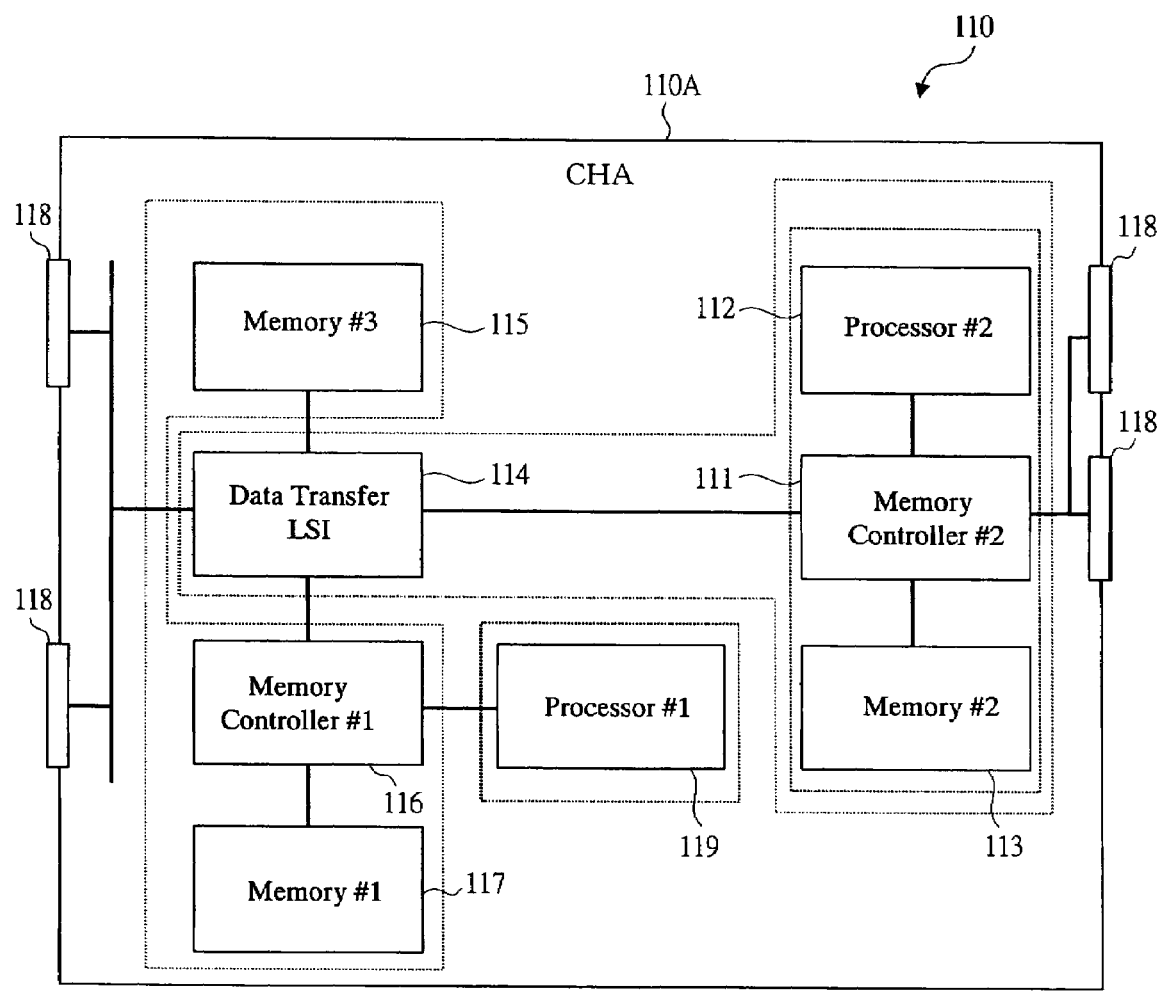
FIG. 4 is a view showing a configuration example of a CHA (first CHA) in the storage apparatus according to the embodiment of the present invention.

FIG. 4 shows a configuration example of the CHA 110 (first CHA). The CHA 110 is configured as one unitized board having a circuit board 110A. The CHA 110 is configured so as to include one or more circuit board 110A. In the circuit board 110, a first processor (processor #1) 119, a second processor (processor #2) 112, a data transfer LSI 114, a first memory (memory #1) 117, a second memory (memory #2) 113, a first memory controller (memory controller #1) 116, a second memory controller (memory controller #2) 111, a third memory (memory #3) 115, and respective connectors 118 are formed.

The processors #1 (119), #2 (112), the data transfer LSI 114, the memory controllers #1 (116), #2 (111), and the memory #3 (115) are communicably connected over PCI buses, respectively. Note that they are not limited to connections over the PCI buses, and a portion or all of the connections may be configured to conform to any other standard.

Broadly classified, in the circuit board 110A, the processor #1 (119) configures the input/output control unit (IOC). In addition, the data transfer LSI 114, processor #2 (112), memory controller #2 (111), and memory #2 (113) configures the data transfer control unit (DTC). In addition, the DTC has the second memory unit configured by the memory controller #1 (116), the memory #1 (117), and the memory #3 (115). A unit configured by the processor #2 (112), the memory controller #2 (111), and the memory #2 (113) configures the communication interface unit that provides a communication interface function for communicating with the other apparatus 700. The communication interface unit has the third memory unit configured by the memory controller #2 (111) and the memory #2 (113).

The connector 118 to be connected to the memory controller #2 (111) is a connector for communicating with the other apparatus 700. The connector 118 to be connected to the data transfer LSI 114 is a connector for communicating with a side of the CM 130 through the connection unit 150.

In order to control the data input/output, the IOC executes reading/writing with respect to the memory #1 (117) and controls the DTC. In order to control the data transfer, the DTC executes the reading/writing with respect to the second memory unit and controls the data transfer involved in the data input/output between the CM 130 and the memory #2 (113). The communication interface unit reads/writes to the third memory and communicates with the other apparatus 700. The communication interface unit converts the data to be transmitted to the other apparatus 700, into a data format that is based on the FC protocol, and transmits it, and converts the data received from the other apparatus 700 into the original format.

The processor #1 (119) controls the entirety of the circuit board 110A configuring the CHA 110 by executing the control program stored in the memory #1 (117). For example, the data input/output request transmitted from the information processor 200 is analyzed to determine whether the request is made to the first drive unit 301 or the second drive unit 302. If the request is made to the first drive unit 301, it is determined whether execution of the remote copying is necessary. Depending on such a determination result, an instruction to transfer the data is given to the data transfer LSI 114. For the instruction to transfer the data, the processor #1 (119) writes, in the memory #1 (117) in the script format, data-transfer information for controlling the data transfer between the CM 130 and the other apparatus 700.

In the communication interface unit, the processor #2 (112) executes control for implementing the communication interface function by executing the various programs stored in the memory #2 (113). In addition, any data sent to and received from the other apparatus 700 is stored in the memory #2 (113). The memory controller #2 (111) executes control over the memory #2 (113). The processor #2 (112) transmits, to the other apparatus 700, the transfer data stored in the memory #2 (113) and also stores, in the memory #2 (113), the transfer data received from the other apparatus 700. A section configured by the communication interface unit and the connector 118 also functions as a port to be connected to a port of the FC switch configuring the SAN 500. The WWN is assigned to each port.

In response to an instruction from the processor #1 (119), the data transfer LSI 114 controls the data transfer between the CM 130, i.e., the first memory unit and the memory #2 (113), i.e., the third memory unit. Specifically, in accordance with the instruction from the processor #1 (119), the data transfer LSI 114 reads the data transfer information written in the memory #1 (117), and controls the data transfer between the CM 130 and the memory #2 (113) based on the read-data transfer information or data transfer information created based thereon. The data transfer information is information containing at least a storage position of the data in the CM 130 and that in the other apparatus 700, i.e., at least a transfer-source address and a transfer-destination address. The memory controller #1 (116) executes control over the memory #1 (117). In the second memory unit, the data transfer LSI 114 in particular uses the memory #3 (115) as an area for saving the data transfer information and the data.

<Memory Configuration>

Figure 5:
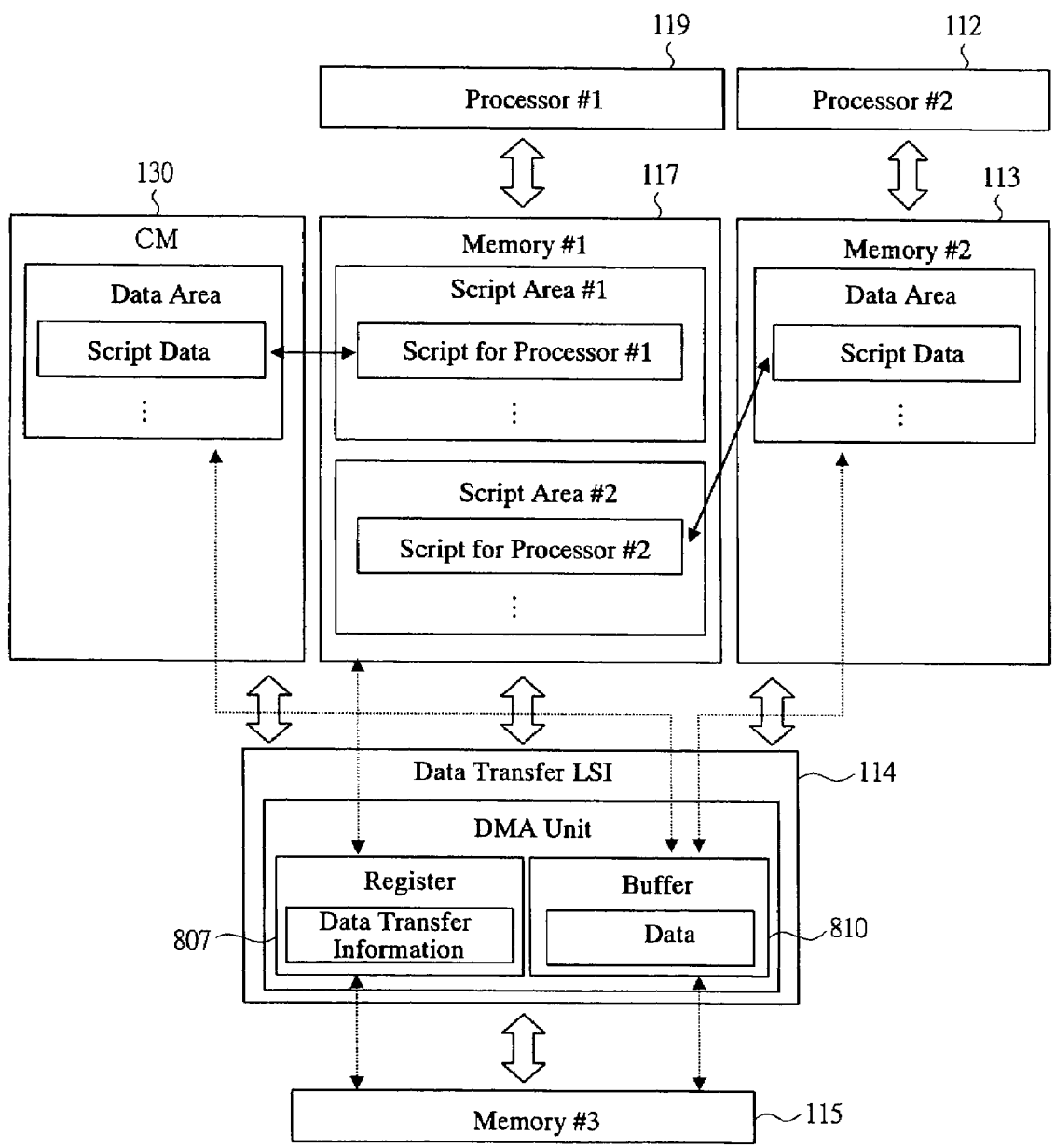
FIG. 5 is a view showing a configuration of and units associated with each of the memories performing the data transfer in the storage apparatus according to the embodiment of the present invention.

FIG. 5 shows configurations of the respective memories related to the data transfer and a relation therebetween. The memory #1 (117) has script areas #1 and #2 for the processors #1 (119) and #2 (112), respectively, and an area of a control program (not shown). The memory #2 (113) has a data area. The CM 130 has a data area. A script for controlling the data input/output is stored in the script area. The data transfer information is configured based on the scripts. In the script area #1, a "script for processor #1 (hereafter abbreviated as S1)" is stored. In the script area #2, a "script for processor #2 (hereafter abbreviated as S2)" is stored. In each data area, "script data" that is the transfer data to be processed depending on the script is stored.

In the data area of the memory #2 (113), data to be transferred to the CM 130 or data having been transferred from the CM 130 is stored. The data transfer information on storage positions of respective pieces of data stored in the data area of the memory #2 (113), storage area size (area length), or the like depends on the respective pieces of data and is stored as P2 in the script area #2 of the memory #1 (117).

The P2 and P1 includes respective columns such as a "script identifier", "area start address", and "area length", "continuous flag". The "script identifier" is an ID number to be assigned to every script. The "area start address" is a storage address of data to be stored in the data area in the memory #2 (113) or CM 130. The "area length" represents storage area size of the data. The "continuous flag" is a flag to be set when a plurality of pieces of data (e.g., a plurality of data blocks) stored in the data area are continuously transferred as one block.

Meanwhile, in the data area of the CM 130, data to be transferred to the memory #2 (113) or data having been transferred from the memory #2 (113) is stored. The data transfer information on storage positions of respective pieces of data or on storage area size stored in the data area in the CM 130 depends on the respective pieces of data and is stored as S1 in the script area #1 of the memory #1 (117). The S1 has the same configuration as that of the S2.

The S2 and S1 are set by the processor #1 (119) and written to the script area #2 and the script area #1 in the memory #1 (117), respectively.

The data transfer LSI 114 writes the data transfer information into a register based on the script written in the memory #1 . It also stores, in a buffer, the data to be transferred between the CM 130 and the memory #2 (113). In addition, the data transfer LSI 114 saves/recovers the data transfer information in the register or the data in the buffer between the memory #3 (115).and the data transfer LSI.

<Configuration of Data Transfer LSI>

Figure 6:
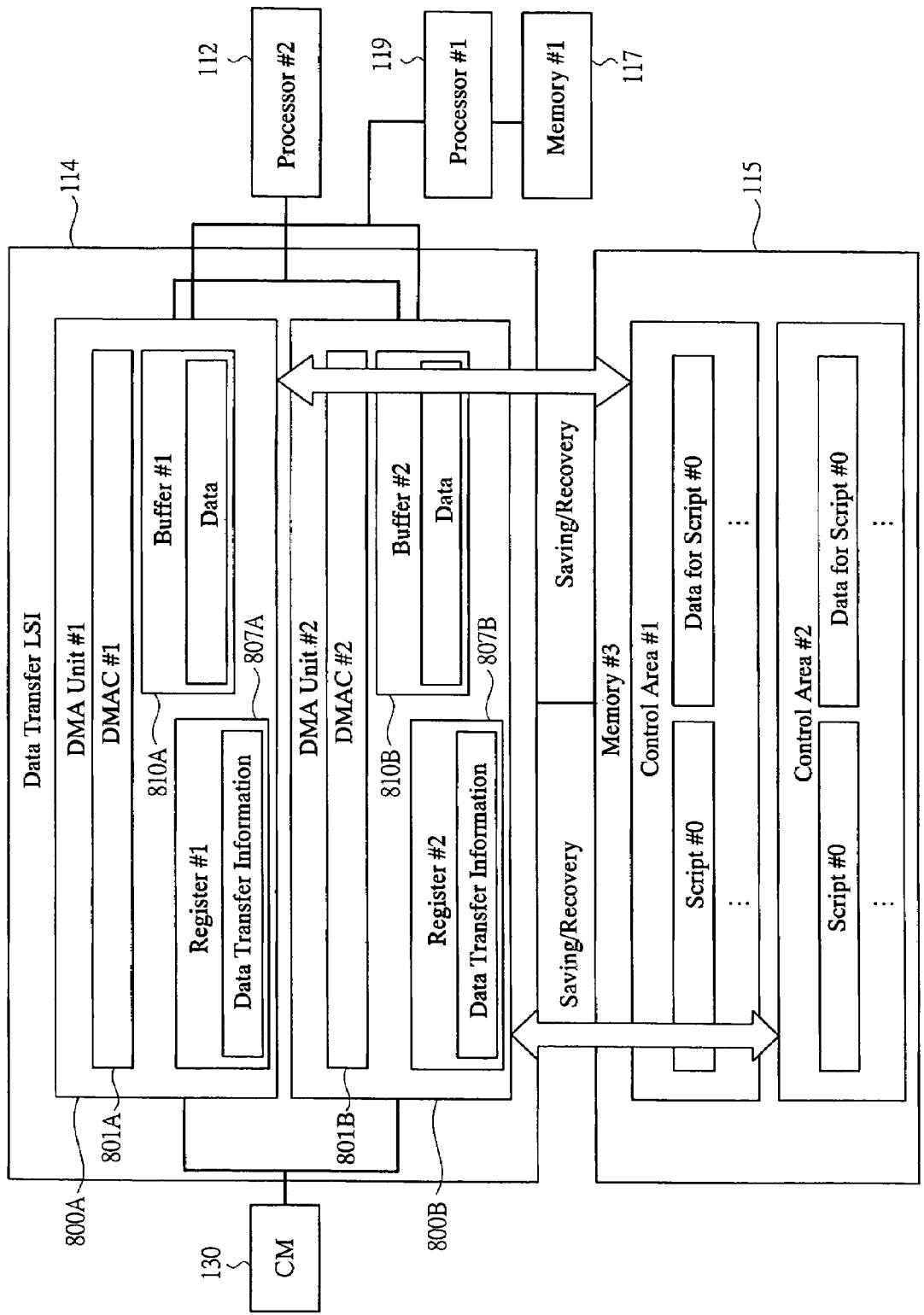
FIG. 6 is a view showing a configuration of a data transfer LSI in the CHA and showing a connection configuration of it and other processors, in the storage apparatus according to the embodiment of the present invention.

Next, FIG. 6 shows a configuration of the data transfer LSI 114 and a configuration of a connection between other processors and the data transfer LSI. The data transfer LSI 114 controls the data transfer between the CM 130 and the memory #2 (113) based on the respective scripts (S1, S2). The data transfer LSI 114 related to the embodiment comprises at least two DMA units 800, i.e., a first DMA unit (DMA unit #1) 800A and a second DMA unit (DMA unit #2) 800B.

The data transfer LSI 114 connects, for example by the PCI interface, the DMA units 800 to other apparatues, namely, to the processor #2 (112), the processor #1 (119), the memory #3 (115), and the CM 130, etc. The PCI interface is an interface for communicating with the respective units through the PCI bus. FIG. 6 shows a logical configuration in which the two DMA units 800 are connected to the processors 112, 119, respectively.

The data transfer LSI 114 determines by which of the two DMA units (801, 802) certain data transfer is controlled. For example, it is determined by which of the DMA units 800 the transfer processing of the certain data is performed between the processor #1 (119) and the two DMA units 800.

The DMA units 800 comprises a DMA controller (DMAC) 801, a register 807, and a transfer data buffer (buffer) 810, wherein the DMA units 800 are in redundant form. In other words, the data transfer LSI 114 has a first DMAC (DMAC #1) 801A, a first register (register #1) 807A, a first buffer (buffer #1) 810A, a second DMAC (DMAC #2) 801B, a second register (register #2) 807B, and a second buffer (buffer #2) 810B. Respective redundant units are the same in function.

The DMAC 801 is a circuit including logic of controlling a DMA-data transfer processing in the DMA unit 800. The DMAC 801 may be configured by only hardware or a combination of hardware and software. In the register 807, the data transfer information based on the scripts is stored. In the buffer 810, the transferred data is stored. In the data transfer LSI 114, two data transfers can be executed concurrently by utilizing two types of DMA units 800. In addition, by accordingly performing a saving/recovering processing as discussed later depending thereon, the plurality of data transfers can be executed in a multiplex manner while being switched.

For the script stored in the memory #1 (117), for example, the DMAC 801 executes reading of the data transfer information into the register 807 for the script stored in the memory #1 (117), control of the data transfer via the buffer 810 based on the read-data transfer information, and an output of data-transfer end status, etc. The DMAC 801 also executes the control over the memory #3 (115). Thus, by using the DMAC 801, the data transfer information stored in the register 807 or the data stored in the buffer 810 can be written into the control area of the memory #3 (115) (also called saving). Or adversely, the data transfer information or the data saved in the control area of the memory #3 (115) can be read into the register 807 or the buffer 810 (also called recovery). The data transfer information or the data in the DMA unit 800A is saved/recovered with respect to the control area #1 of the memory #3 (115). The data transfer information or the data of the DMA unit 800B is saved/recovered with respect to the control area #2 in the memory #3 (115). Note that the information saved in the memory #3 (115) may be in the script format or be the data transfer information (parameter) of a portion thereof.

In addition, as the extended form, the data transfer LSI 114 may be configured to further have a plurality of sections, each of which includes two DMA units 800. In addition, the connection buses between the DMA units 800 and the CM 130 may each have a more multiplex configuration than the connection bus with a side of the communication interface unit. For example, another configuration, in which a communication channel between the buffer 810 and the memory controller #2 (111) is shared by the buffer #1 (810A) and the buffer #2 (810B) and a communication channel between the buffer 810 and the CM 130 is separately provided with the buffer #1 (810A) and the buffer #2 (810B), may be adopted. This is because communication with the side of the memory controller #2 (111) is relatively high speed for being established on the same circuit board, whereas communication with the side of the CM 130 is relatively slow for being established through the different circuit boards.

<Register Configuration>

Figure 7:
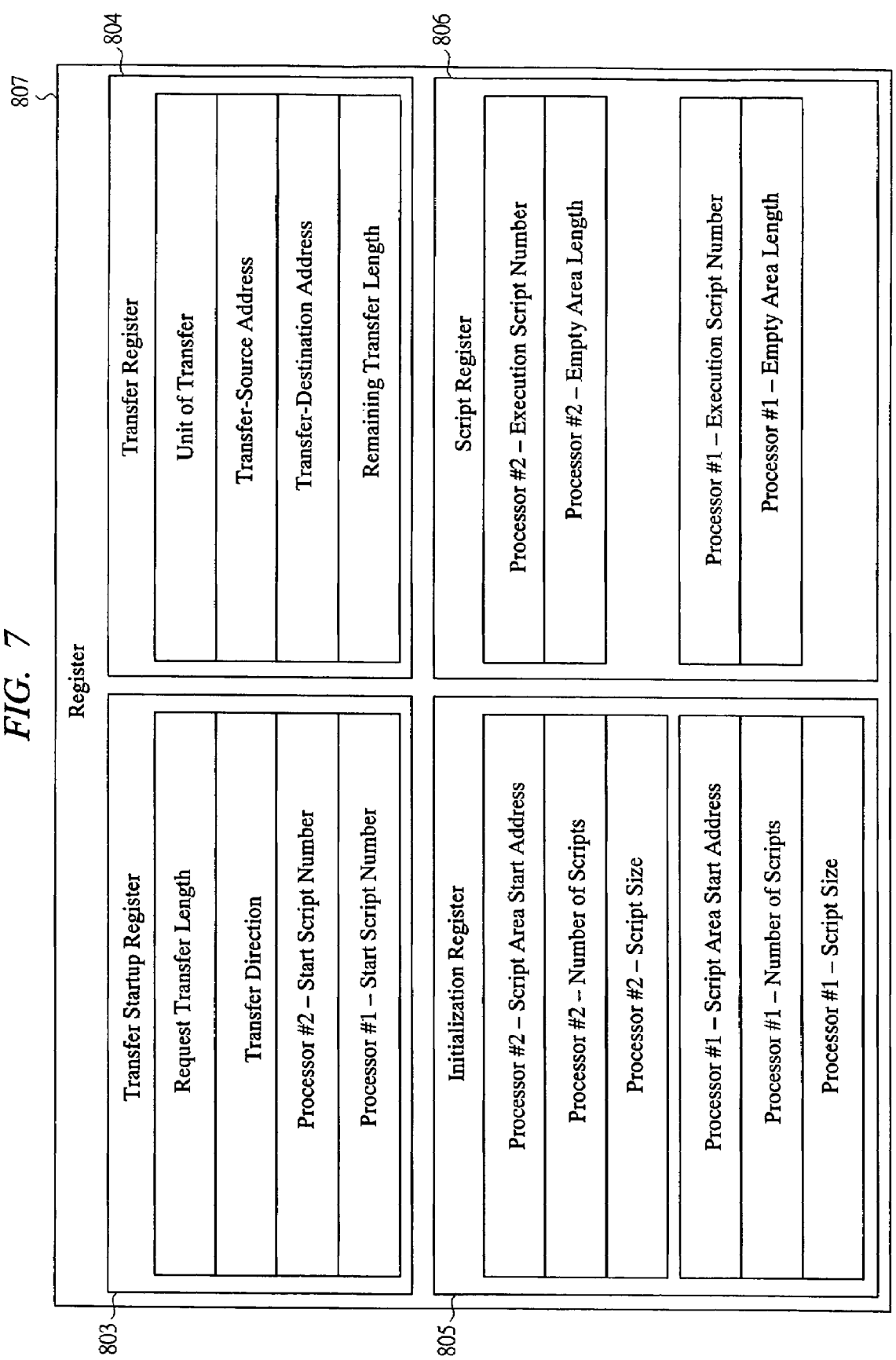
FIG. 7 is a view showing a detailed configuration example of registers in DMA units in the data transfer LSI, in the storage apparatus according to the embodiment of the present invention.

FIG. 7 shows a detailed configuration example of the register 807 in the DMA unit 800. The register 807 has a transfer startup register 803, a transfer register 804, an initialization register 805, and a script register 806.

The transfer startup register 803 includes respective registers of a "request transfer length", "transfer direction", "startup script number of processor #2", and "startup script number of processor #1".

The "request transfer length" register stores a total data length of data to be transferred between the CM 130 and the other apparatus 700. The "request transfer length" is determined based on the data input/output request received from the information processor 200. For example, when a data write request of 8 kb in size is received, information indicating the content of 8 kb is stored.

In the "transfer direction" register, information indicating a data transfer in a direction from the other apparatus 700 to the CM 130 or that in a direction from the CM 130 to the other apparatus 700 is stored. The "transfer direction" is determined based on the data input/output request, which the processor #1 (119) receives from the information processor 200. For example, when the processor #1 (119) receives, from the information processor 200, a data write request to write the data to the first drive unit 301, the "transfer direction" is changed from the memory controller #2 (111) toward the CM 130. In addition, when the processor #1 (119) receives a data-read request to read the data stored in the first drive unit 301 from the information processor 200, the "transfer direction" is changed from the CM 130 toward the memory controller #2 (111). In addition, if the data is received from the second controller 102 to the first controller 101, the "transfer direction" is changed from the memory controller #2 (111) to the CM 130.

The processor #1 (119) writes the "request transfer length" or "transfer direction" into the transfer startup register 803 of the DMA unit 800 when the processor #1 (119) makes the DMA unit 800 start performing the data transfer.

The "processor #2—startup script number" register stores an identifier of P2 contained in the memory #1 (117). The DMAC 801 reads the P2 indicated by the register from the memory #1 (117), and starts the data transfer. The processor #1 (119) writes the "processor #2—startup script number" in the transfer startup register 803 when the processor #1 (119) makes the DMA unit 800 start performing the data transfer. Or, if the continuous flag is set in the P2, the DMAC 801 updates the "processor #2—startup script number".

The "processor #1—startup script number" register stores an identifier of P1 contained in the memory #1 (117), and have the same role as the "processor #2—startup script number" register.

The transfer register 804 includes respective registers of a "transfer unit", "transfer-source address", "transfer-destination address", and "remaining transfer length".

The "transfer unit" register stores the data transfer length in one data transfer. The DMAC 801 calculates the data transfer length in the one data transfer.

The "transfer-source address" register indicates a storage position of the pre-transfer data. The "transfer-destination address" indicates a storage position of the post-transfer data. The "transfer-source address" or "transfer-destination address" is a storage position of the data in the CM 130, the information processor 200, or the second storage apparatus 602. The "transfer-source address" or "transfer-destination address" is determined based on the "transfer direction" and on a description of the P1 or P2. During the data transfer, as the transfer progresses, the DMAC 801 appropriately increments or decrements a value of the register.

The "remaining transfer length" register indicates a value to be obtained by subtracting the length of the transferred data from the "request transfer length". The DMAC 801 appropriately updates the "remaining transfer length" as the data transfer progresses.

The initialization register 805 includes respective registers of the "processor #2—script area start address", "processor #2—number of scripts", "processor #2—script size", "processor #1—script area start address", "processor #1—number of scripts", and "processor #1—script size". For example, at a time of making a power-on reset of the CHA 110, these setting values of the above registers can be read by the DMAC 801 from the unshown NVRAM that the CHA 110 includes.

The "processor #2—script area start address" register indicates a start address of the script register in the memory #1 (117). In other words, it indicates an address where P2#0 is stored.

The "processor #2—number of scripts" register indicates the number of the P2.

The "processor #2—script size" register indicates the size of the P2. Since the identifier of P2 is specified by fixing the P2 size, a storage address of P2, in which the start address of the script area is set as a standard and which is to be an object, can be calculated.

The respective registers of the "processor #1—script area start address", "processor #1—number of scripts", and "processor #1—script size" are ones, in each of which the information for the processor #1 is stored, and each have the same role as the respective registers of the processor #2.

The script register 806 includes respective registers of "processor #2—execution script number", "processor #2—effective area length", "processor #1—execution script number", and "processor #1—effective area length".

The "processor #2—execution script number" register indicates the identifier of P2, which is now being executed. The "processor #2—execution script number" is set by the DMAC 801.

The "processor #2—effective area length" register is a value obtained by subtracting the size of the transferred data from the area length described in the above column of area length in the P2. The DMAC 801 approximately decrements the value as the data transfer progresses.

The respective registers of the "processor #2—execution script number" and "processor #1—effective area length" are ones, in each of which the information for the processor #1 is stored and which have the same role as the respective registers of the processor #2.

The buffer 810 stores the transfer data when the data is transferred between the CM 130 and the memory #2 (113). In other words, when the data is transferred between the CM 130 and the memory #2 (113), the DMAC 801 transfers the data through the buffer 810 in a store-and-forward method. For example, the DMAC 801 once writes, into the buffer 810, the data read from the CM 130, reads the data from the buffer 810 at the transfer timing, and writes it into the memory #2 (113).

<Data Input/Output Processing>

Next, the entirety of a data input/output processing in the storage system shown in FIG. 2 will be described. When a data input/output request is transmitted from the information processor 200, the processor #1 (119) analyzes the received data input/output request and determines a need for the drive unit 300 or remote copying to be an input/output destination of the request. Then, depending on the determination, the processor #1 (119) gives the data transfer LSI 114 an instruction of the data transfer through the script. The determination is made by referring to a pair control table and a configuration information management table stored in the SM 120. The pair control and the configuration information management are well-known techniques.

The configuration information management table is management information capable of fulfilling such a function that the first storage apparatus 601 provides, as the storage volume 310 of the first storage apparatus 601, the storage volume 310 of the second storage apparatus 602 to the information processor 200. In the configuration information management table, information on the respective storage volumes 310 in the first and second storage apparatuses 601, 602 is described. The configuration information management table has columns of Port ID, WWN, LUN, capacity, and Mapping LUN. In the Port ID column, the port ID of the CHA 110 associated with the storage volume 310 is described. In the WWN column, the WWN to be associated with the port ID is described. In the LUN column, the LUN associated with each storage volume 310 is described. In the capacity column, the storage capacity to be provided by each storage volume is described. In the mapping LUN column, the LUN of the storage volume 310, which is associated with the port ID and LUN and which the second storage apparatus 602 has, is described.

The first storage apparatus 601 can use the configuration information management table to provide the storage volume 310 of the second storage apparatus 602, which serves as the storage volume 310 of the first storage apparatus 601, that is, provide it as a virtual storage volume. In other words, the information processor 200 can read/write data by making the data input/output request for the first storage volume 310 of the second storage apparatus 602 with respect to the storage apparatus 601. When receiving the data input/output request for the virtual storage volume from the information processor 200, the first storage apparatus 601 executes the data transfer between it and the second storage apparatus 602 and accesses an actual storage volume associated with the above virtual storage volume.

Next, a description will be made of the case of making a data input/output request for the storage volume 311 of the first storage apparatus 601 or the storage volume 312 of the second storage apparatus 602 from the information processor 200 to the first storage apparatus 601.

The data input/output request issued from the information processor 200 is in the format of having information on host ID, port ID, LUN, address, and data length, by way of example. The host ID is an identifier of the information processor 200 transmitting the data input/output request and describes, for example, the WWN of the port of the information processor 200. The port ID is a port ID of the CHA 110 associated with the storage volume to be an object of the data input/output request. The LUN is an LUN of the storage volume 310 to be an object of the data input/output request. The address is a storage address of data to be an object of the data input/output. The data length is a data length of data to be an object of the data input/output.

A description will be made of an example of the case where the data input/output request transmitted from the information processor 200 is a data read/write request to the storage volume 312 of the second storage apparatus 602. First, the data write request is received by the CHA 110 of the controller 101 in the first storage apparatus 601. The processor #1 (119) executes a processing of storing, in the CM 130, the write data received together with the data write request.

Next, the processor #1 (119) refers to the configuration information management table and determines whether the data write request can be executed. Herein, the case where the request cannot be executed means, for example, the case where the storage volume 310 to be a processing object of the data write request does not exist or where size of the write data exceeds the capacity of the storage volume 310 even if the processing object exists. Thus, when the data input/output request cannot be executed, a message of such inexecution is transmitted to the information processor 200, thereby ending a processing corresponding to the data input/output request.

Meanwhile, if the data write request can be executed, the processor #1 (119) transmits the data write request and the write data to the second storage apparatus 602. Such transmission is carried out as follows. That is, firstly, the processor #1 (119) writes a script for data transfer into the memory #1 (117), and then the data transfer LSI 114 reads the script into the register 807 from the memory #1 (117) and controls the data transfer between the memory #1 (117) and the second controller 102 in accordance with the data transfer information based on the read script. Then, the second storage 602 receives the data write request and writes the write data into the storage volume 312 of the second drive unit 302. The case of reading the data is also carried out similarly thereto.

Note that the data write request transmitted from the first storage apparatus 601 to the second storage apparatus 602 conforms to a protocol identical to the data write request received from the information processor 200 and have the same data format, for example. Therefore, if the second storage apparatus 602 is utilized so as to function as an apparatus for providing the storage volume 310 to the first storage apparatus 601, effective utilization of the second storage apparatus 602 can be obtained without requiring any particular change etc. of the configuration or specification of the second storage apparatus 602.

Next, a pair control table will be described. The pair control table has columns of "Pair Type", "Duplication Method", "Duplication Source Device", "Duplication Destination Device", "Duplication Source Volume", "Duplication Destination Volume", and "Pair State".

A pair means a combination formed by the two storage volumes 310. In addition, when the two storage volumes 310 forming a pair are in the same storage apparatus 600, they are represented as a "local pair", while if being in the different storage apparatus 600, they are called as a "remote pair". In the storage volumes 310 forming a pair, one thereof is managed as "main storage volume" and the other thereof is managed as "sub-storage volume". A plurality of storage volumes may be combined with one main storage volume.

When the information processor 200 gives the first storage apparatus 601 to be a data-duplication source an instruction to form a remote pair, the storage apparatus 601 updates the pair control table of the SM 120. Then, the storage apparatus 601 gives the second storage apparatus 602 to be a data-duplication destination an instruction to form a remote pair. Thereafter, the second storage apparatus 602 updates the pair control table of the SM 120 in the storage apparatus 602.

The "Pair Type" column of the pair control table indicates whether the relevant pair is a local pair or remote pair. The "Duplication" column indicates whether the remote copying method is synchronous or asynchronous when the pair is a remote pair. The "Duplication-Source Device" and "Duplication-Destination Device" columns respectively indicate the duplication-source and duplication-destination storage apparatuses 600 when the pair is a remote pair. The "Duplication-Source Volume" column shows a LUN of the main storage volume of the above pair and the "Duplication Destination Volume" column shows a LUN of the sub-storage volume of the relevant pair.

The "Pair State" column shows a state of the relevant pair. The state includes "In-Pair", "In-Split", and "In-Rethink" states. In the "In-Pair" state, duplication of the data written into the main storage volume from the information processor 200 is reflected in the sub-storage volume. By associating the main storage volume and the sub-storage volume, identity of contents stored in the main storage volume and those stored in the sub-storage volume can be ensured. In the "In-Split" state, even if the data is written into the main storage volume from the information processor 200, it is not reflected in the sub-storage volume. The "In-Rethink" state is in a state of changing from the "In-Split" state to the "In-Pair" state. In other words, the data updating made to the main storage volume in the "In-Split" state is in a state of being reflected in the sub-storage volume. After completion of the reflection, the "In-Rethink" state becomes in the "In-Pair" state.

The forming, splitting, and rethinking of the above pair can be executed since an instruction input is given by an operator from the input device to the information processor 200 by which the management program is executed. The instruction input is sent to the CHA 110 of the storage apparatus 600, and the CHA 110 executes the control program to form the pair, change the pair state, or the like in accordance with the above instruction. For example, when receiving the data read request to the main storage volume (311) in the "In-Pair" state in accordance with the pair state of the formed pair, the CHA 110 transmits the duplication of the write data to the second storage apparatus 602 and makes it reflected in the sub-storage volume (312).

Specifically, first of all, when the first storage apparatus 601 receives a data store request from the information processor 200, the processor #1 (119) stores, in the CM 130, the received write data together with the data write request. Then, the processor #1 (119) gives, to the DKA 140, an instruction to write the data into the first storage volume (main storage volume) 311, and concurrently refers to the pair control table to specify the storage volume (sub-storage volume) 312 into which duplication of the data is written. Then, also in order to write duplication of the write data also into the storage volume (312), the processor #1 (119) writes a script for controlling the data transfer into the memory #1 (117). Next, the data transfer LSI 114 controls the transmission of the write data to the second controller 102 on the basis of the script having been read from the memory #1 (117). Then, the second storage apparatus 602 receives the data write request and writes the write data into the storage volume 312.

Thus, in the storage system, depending on the data input/output request received by the first storage apparatus 601 from the information processor 200, the data transfer is performed between the first storage apparatus 601 and the second storage apparatus 602. The data transfer is executed by an IOC including the processor #1 (119) and a DTC including the data transfer LSI 114. However, in the conventional configuration, while a first data transfer is performed between the first and the second storage apparatuses 601, 602, a second data transfer is not performed until the first data transfer ends. For example, one or more data block is transferred for a certain series of data A and until it ends, one or more data block for another series of data B is not transferred. In other words, there is not conventionally configured so that the DTC can execute the plurality of data transfers in a multiplex manner.

FIG. 8 is a sequence diagram showing a processing example of a plurality of data inputs/outputs in a conventional configuration. It shows a data read processing, in particular. Note that FIG. 8 shows that by a response processing associated with one read command, the plurality of pieces of read data are transmitted/received and this corresponds to the fact that the data transfer is controlled by the data block. First, a read command #1 is issued/transmitted from the information processor 200 to the first storage apparatus (A) 601 (S1000). The corresponding read command #1 is issued/transmitted from the first storage apparatus (A) 601 to the second storage apparatus (B) 602 (S1001). The second storage apparatus 602 executes the response processing of the read data #1, which corresponds to the received read command #1 (S1002). By this response processing, the read data #1 is transmitted to the first storage apparatus 601 (S1002). Then, the read data #1 is sent from the first storage apparatus 601 to the information processor 200. A transfer processing #1 indicates a processing associated with the read command #1. In addition, the information processor 200 issues a read command #2, and a transfer processing #2 is executed similarly to the transfer processing #1 (S1005 to S1009). In the conventional configuration, since the DTC in the storage apparatus 601 cannot execute a multiprocessing of the data transfer, the transfer processings #1 and #2 is sequentially performed.

Figure 9A:
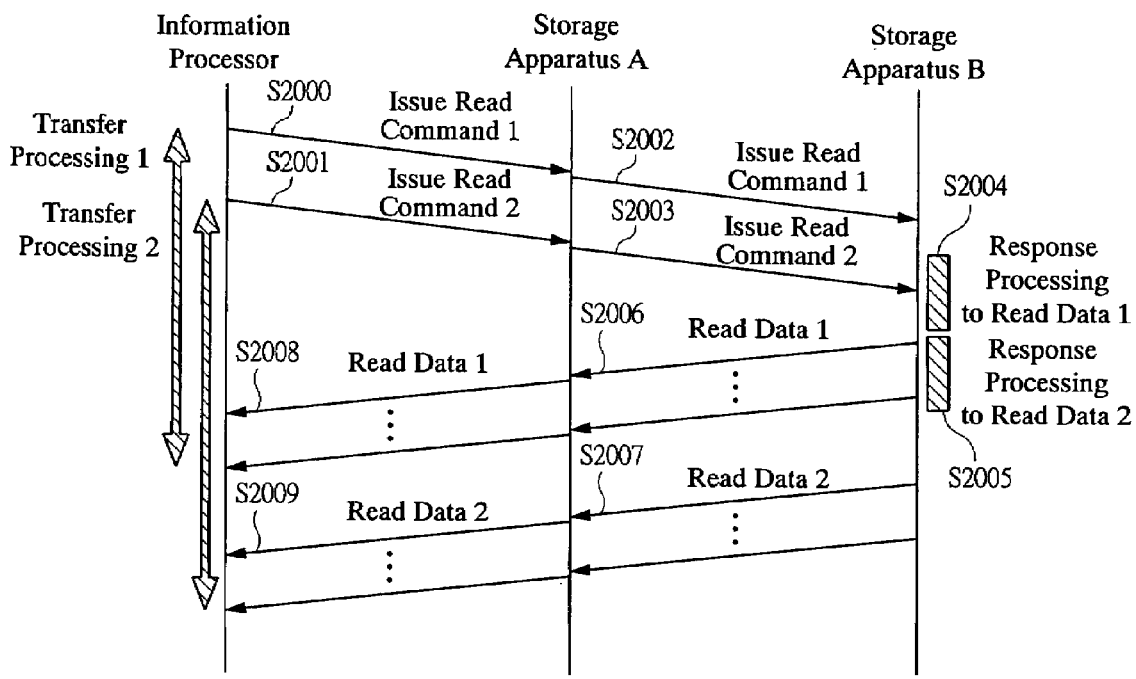
FIG. 9A is a sequence diagram showing a processing example of the plurality of data inputs/outputs in the storage apparatus according to the embodiment of the present invention.
Figure 9B:
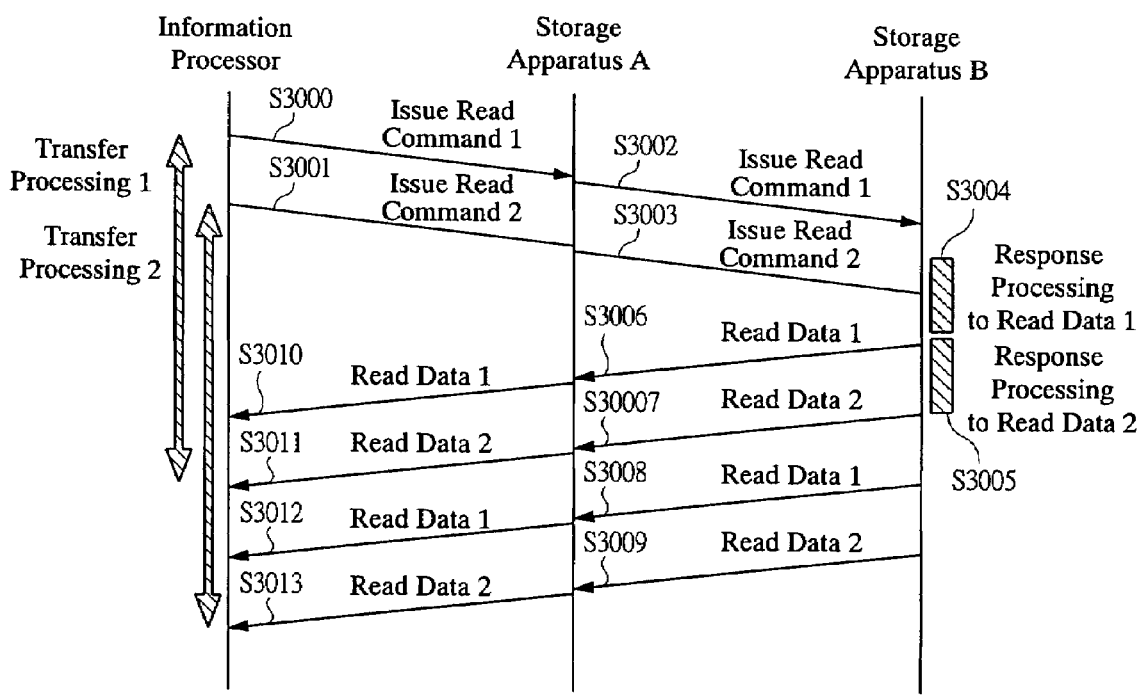
FIG. 9B is a sequence diagram showing a processing example of the plurality of data inputs/outputs in the storage apparatus according to the embodiment of the present invention.

Meanwhile, FIGS. 9A and 9B are sequence diagrams showing processing examples of a plurality of data inputs/outputs in the storage apparatus 600. In the first controller 101, the DTC can execute the first and second transfer processings #1 and #2 in a multiplex manner without waiting until the transfer processing #1 ends. In response to issuance of the read command #1 from the information processor 200, the read data #1 is transmitted to the second storage apparatus 602, whereby the second storage apparatus 602 performs the response processing of the read data #1. In the first storage apparatus 601, if a next read command #2 is received from the information processor 200 before a reception of the read data #1 from the second storage apparatus 602 begins, the read command #2 is transmitted to the second storage apparatus 602.

The processing example shown in FIG. 9A is the case where the first storage apparatus 601 transmits a read command #2 to the second storage apparatus 602 before receiving the read data #1 from the second storage apparatus 602 (S2003) and receives read data #2 (S2007) after receiving the read data #1 from the second storage apparatus 602 (S2006).

The processing example shown in FIG. 9B is the case where the first storage apparatus 601 transmits the read command #2 to the second storage apparatus 602 before receiving the read data #1 from the second storage apparatus 602 (S3003) and receives the read data #2 (S3007) before receiving the read data #1 from the second storage apparatus 602 (S3006 and S3008).

In the data transfer LSI 114 of the first storage apparatus 601, the transfer processings #1 and #2 are performed in a multiplex manner while controlling the saving/recovery by using the two DMA units 800. In other words, the DMA units 800 can start the first data transfer for the read data #1 and also start the second data transfer for the read data #2 during the processing of the first data transfer and concurrently resume and process the first data transfer during the processing of the second data transfer.

<Flow of Data Transfer>

Figure 10:
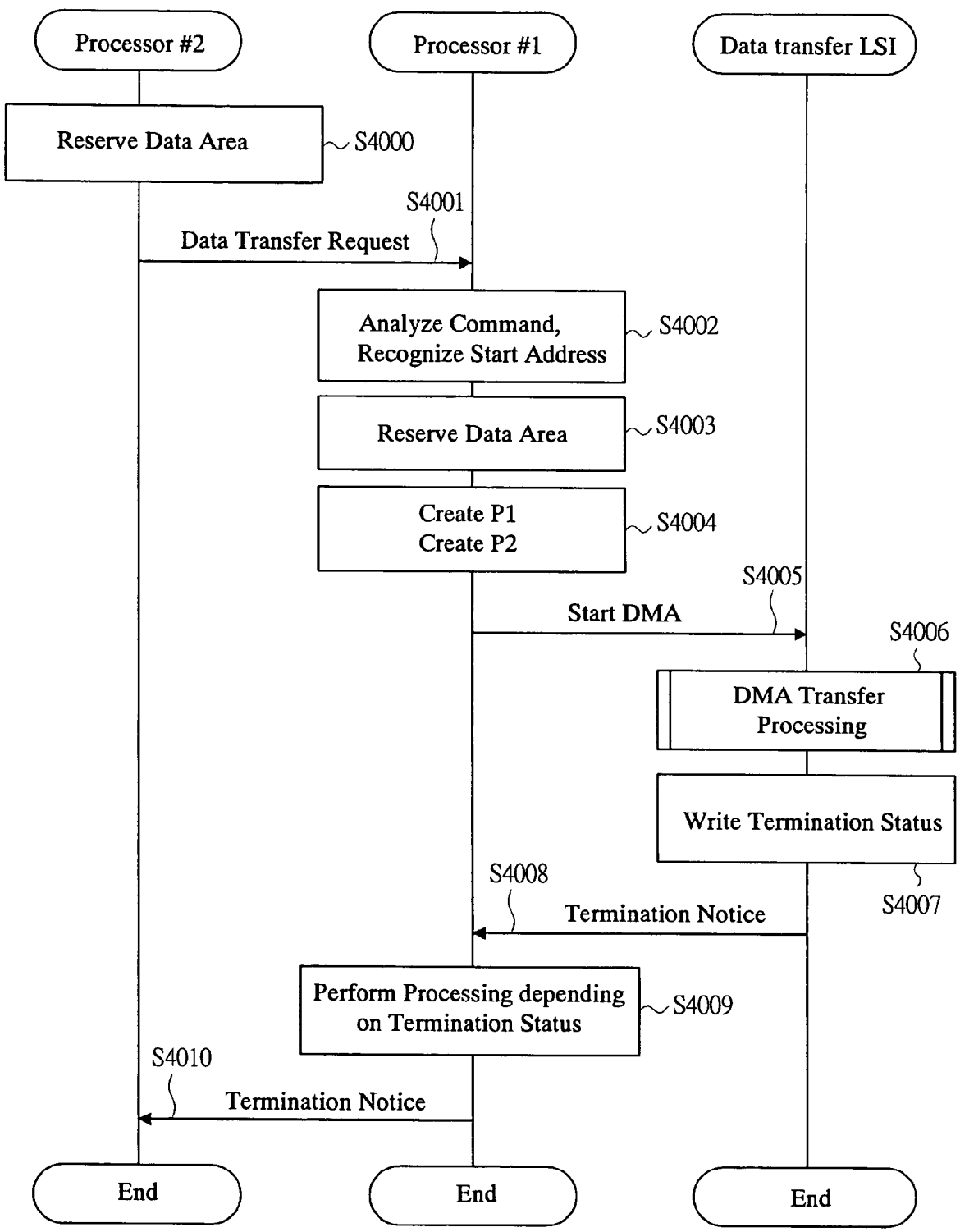
FIG. 10 is a flow diagram showing a data transfer processing in the CHA (first CHA) in the storage apparatus according to the embodiment of the present invention.

Next, FIG. 10 is a flow diagram showing a data transfer processing by the CHA 110 (first CHA) of the storage apparatus 600. It shows a processing relation among respective units of the processor #2 (112), the processor #1 (119), and the data transfer LSI 114. First, when the first controller 101 receives a data input/output request from the information processor 200, the processor #2 (112) reserves a data area in the memory #2 (113) (S4000). Reservation of the data area means to store the write data in the memory #2 (113) when the data input/output request transmitted from the information processor 200 is a write request, and to reserve, in the memory #2 (113), the data area for storing the read data when it is a read request. The data area to be reserved here is not necessarily one. This is because data related to one data input/output request may be divided into a plurality of blocks and stored in the memory #2 (113) in accordance with a status of a distribution of areas capable of storing the data in the memory #2 (113).

Then, the processor #2 (112) transmits, as a data transfer request to the processor #1 (119), the data input/output request received from the information processor 200 and information on the data area reserved in the memory #2 (113) (S4001). In the data transfer request, an area start address is informed.

Then, the processor #1 (119) analyzes the data input/output request transmitted from the processor #2 (112) (S4002). Thereby, the processor #1 (119) recognizes the request transfer length and the transfer direction, whereby the area start address is recognized. Thereafter, the processor #1 (119) reserves, in the CM 130, a data area whose size is specified by the request transfer length (S4003). Also at this time, depending on the condition of the CM 130, a plurality of data areas may be reserved in some cases. Then, the processor #1 (119) creates the P1 corresponding to each data area reserved in the CM 130. Similarly, the P2 corresponding to each data area reserved in the memory #2 (113) is created from the data transfer request transmitted from the processor #2 (112) (S4004). If the plurality of data areas is reserved, the continuous flag is set to control together the respective P1 and P2. Thereby, the P1 including the data storage position information in the CM 130 and the P2 including the data storage position information in the other apparatus 700 are written into the memory #1 (117).

Thereafter, by the processor #1 (119), the transfer startup information including the request transfer length, the transfer direction, the identifier of P2, and the identifier of P1 is transmitted to the register 807 in the DMA units 800, which the data transfer LSI 114 has, and then writes the information into the transfer startup register 803. Thereby, the processor #1 (119) starts up the data transfer LSI 114 (S4005). In accordance with the transfer startup information, the data transfer LSI 114 starts up any of the DMA units 800, and the DMA units 800 starts the DMA transfer processing (S4006).

In the DMA transfer processing, first, based on the transfer startup information, the DMAC 801 acquires the P1 and P2 from the memory #1 (117), by the identifier of P1 and that of P2 described in the transfer startup information from the processor #1 (119). In acquisition of the script, first, the DMAC 801 calculates a storage address of the P1 in the memory #1 (117), from the P1 identifier described in the transfer startup information transmitted from the processor #1 (119) and from the "processor #1—script size" stored in the initialization register 805 on the basis of the transfer startup information. After the storage address of P1 is calculated, the P1 is read from the storage address of the memory #1 (117). Now, the DMAC 801 describes the area start address described in the P1, into the column of transfer-destination address or the transfer-source address of the transfer register 804 depending on the transfer direction. Then, the script identifier described in the P1 and the area length described in the area length column are written into the columns of the "processor #1—execution script number" column and the "processor #1—effective area length" of the script register 806, respectively. Similarly to the processing for P1, the DMAC 801 also executes the processing for P2 based on the transfer startup information.

Next, the DMAC 801 determines a unit for transfer. In determining the unit for transfer, the DMAC 801 first writes the remaining transfer length in the column of the remaining transfer length of the transfer register 804. When the transfer begins, the request transfer length is written. Then, the effective area length of the processor #1 (119), the effective area length of the processor #2 (112), or the remaining transfer length, whichever is shortest, is set as a unit for transfer. Then, the DMAC 801 transfers, to the transfer destination address, the data stored in the transfer-source address stored in the transfer register 804, that is, the data size defined by the unit for transfer. The transfer is executed via the buffer 810.

While the transfer is executed, the transfer-source address, the transfer-destination address, and the remaining transfer length of the transfer register 804 are sequentially updated and concurrently a "processor #2—effective area length" and a "processor #1—effective area length" of the script register 806 are sequentially decreased in proportion to the size of the transferred data.

When values of the "processor #2—effective area length" and the "processor #1—effective area length" or a value of the remaining transfer length of the script register 806 become(s) zero, the DMAC 801 executes a transfer-end determination processing. In the transfer-end determination processing, the DMAC 801 checks the remaining transfer length of the transfer register 804. Since the transfers of all pieces of data corresponding to the request transfer length are completed in the case where the remaining transfer length is zero in value, the processing is finished. Meanwhile, if the value of the remaining transfer length is not zero, at least one of the "processor #1—effective area length" and the "processor #2—effective area length" is zero. In this case, in the script whose effective area length is zero, there is a script that is connected to the continuous flag and should be executed next. Thereby, it is determined whether the script to be executed next is the P1 or P2.

Then, in a processing for determining the script to be executed next, first, the DMAC 801 checks whether the "processor #1—effective area length" of the script register 806 is zero. If it is zero, the "processor #1—start script number" is updated (incremented). If not zero, whether the "processor #2—effective area length" of the script register 806 is zero is subsequently checked. If it is zero, the "processor #2—start script number" is updated (incremented). If not zero, this procedure ends.

Then, the DMAC 801 executes the processing for acquiring the script again. At this time, the DMAC 801 reads the script specified by the "processor #1—start script number" or "processor #2—start script number" of the transfer startup register 803 updated by the above processing. Then, the DMAC 801 executes a DMA transfer in accordance with the newly read script.

When the remaining transfer length of the transfer register 804 becomes finally zero in the transfer-end determination processing, the DMAC 801 terminates the transfer processing. Then, the DMAC 801 writes, in the memory #1 (117), a termination status in which results of the transfer processing are described (S4007), and gives the processor #1 (119) a termination notice (S4008). The termination notice can be given through transmission of an interrupt signal, for example.

The processor #1 (119) reads the termination status from the memory #1 (117) and executes the processing corresponding to contents thereof (S4009). Then, the processor #1 (119) transmits a termination notice to the processor #2 (112) (S4010). When the processor #2 (112) receives the termination notice, a processing associated with the data input/output request is performed. If the data input/output request is a data read request, the read data transferred to the data area in the memory #2 (113) can be read out and transmitted to the information processor 200. In addition, if the data input/output request is a write request, a write end report is transmitted to the information processor 200.

Now, as described above, the DMA unit 800 can control the memory #3 (115) in accordance with the DMA-data transfer processing. Therefore, as occasion arises, the DMA unit 800 can write (save), into the control area of the memory #3 (115), the data transfer information stored in the register 807 and the data stored in the buffer 810, or read (recover) them from the control area of the memory #3.

As shown in FIG. 6, the saving/recovery for the data transfer information and the data is executed between the memory in the DMA unit 800 and the memory #3 (115) under the control of the DMAC 801. The data transfer information on the register 807 and parameters configuring its portion are associated with the above script. The data on the buffer 810 is associated with the script data. Control areas #1 and #2 associated with the two DMA units 800 and retaining respectively the script and script data are reserved in the memory #3 (115). In the saving operation, for example, the data transfer information or the parameters stored in the register #1 (807A) of the DMA unit #1 are written to the area of the script #0 in the control area #1 within the memory #3 (115). In addition, the data stored in the buffer #1 (810A) is written to the data area of the script #0 in the control area #1 within the memory #3 (115). Also in the recovering operation, the script or script data is read to the memory in the DMA unit 800 from the control area #1 in the memory #3 (115), for example.

By controlling the saving/recovery in the CHA 110, the second data transfer based on the second data transfer information can be controlled while one DMA unit 800 is controlling the first data transfer based on the first data transfer information. In other words, the DMA units 800 can be controlled by saving, into the memory #3 (115), the first data transfer information stored in the register 807 and the data stored in the buffer 810 (e.g., data blocks configuring the data A) and by recovering the second data transfer information transferred to the register 807 from the memory #3 (115) and the data to which the transfer processing is performed in the buffer 810.

In addition, the data transfer information and the data to be saved into the memory #3 (115) are not limited to that associated with one script and may be associated with a plurality of scripts. Thus, by using the saving/recovery into the memory #3 (115), the data transfer LSI 114 can process the plurality of data transfers in a multiplex manner.

As the parameters associated with one data transfer, the information such as the transfer-source address, transfer destination address, transfer length, transfer command, control information, and check code is saved into the control area of the memory #3 (115). The transfer-source address and the transfer-destination address are associated with respective addresses stored in the transfer register 804. In addition, the transfer length can be set to values etc. obtained by subtracting the remaining transfer length from the remaining transfer length stored in the transfer register 804 or from the request transfer length stored in the transfer startup register 803. In addition, the transfer command can be set to, for example, the transfer direction stored in the transfer startup register 803, the data input/output request transmitted to the controller 100 from the information processor 200, or the like. In the latter case, a register for storing the data input/output request is provided in the DMA units 800, and the data input/output request to be stored in the register is written to the memory #3 (115). In addition, the control information may be, for example, various types of pieces of status information to be stored when the DMAC 801 controls the data transfer. Further, the check code may be, for example, a check sum or CRC (Cyclic Redundancy Check).

<Second CHA>

Figure 11:
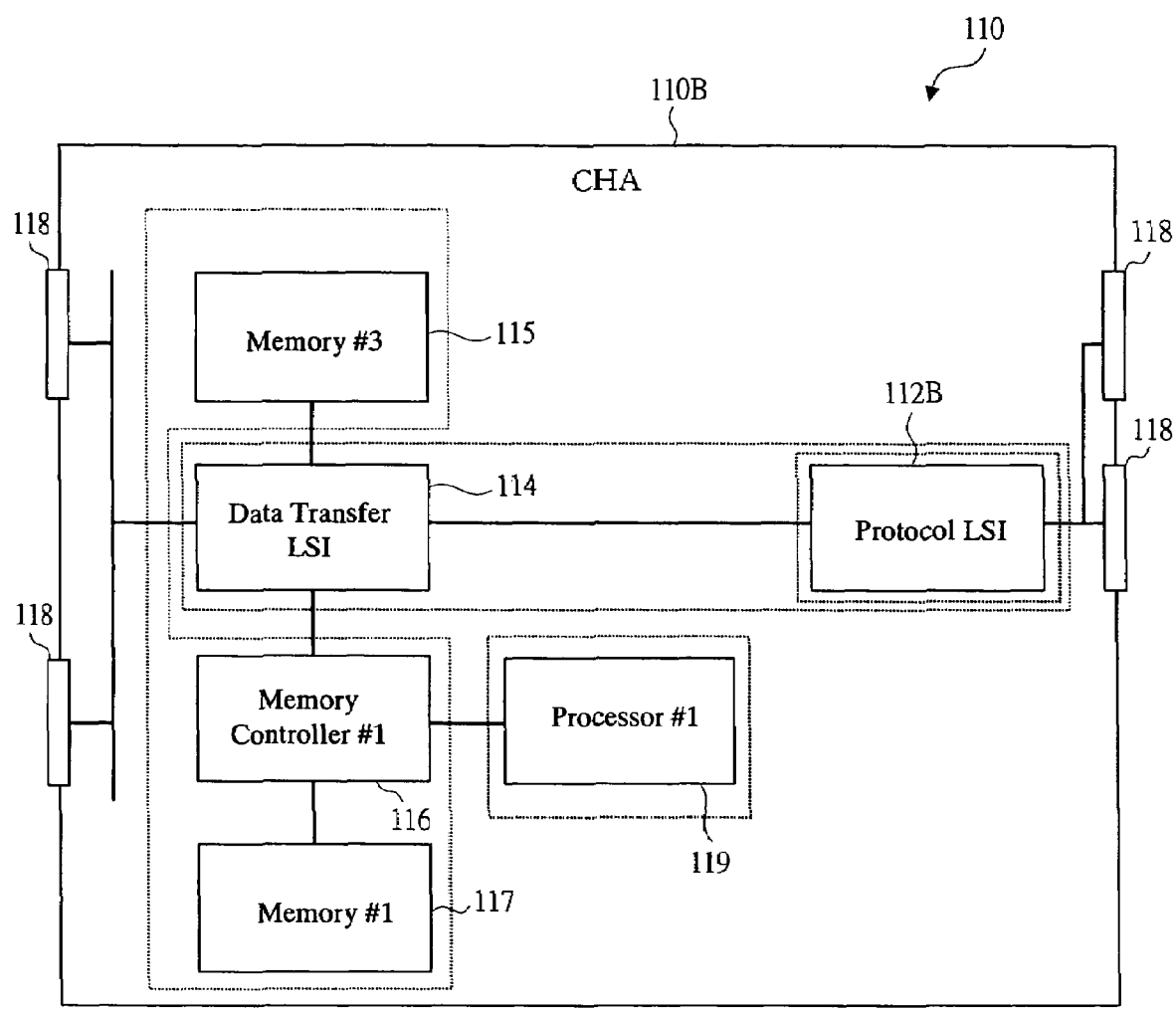
FIG. 11 is a view showing a configuration example of another CHA (second CHA) in the storage apparatus according to the embodiment of the present invention.

FIG. 11 shows an example of another configuration of CHA 110 (second CHA) in the storage apparatus 600. The communication interface function in the first CHA 110 shown in FIG. 4 is not limited to a configuration, in which the processor #2 (112), the memory controller #2 (111), and the memory #2 (113) configuring a communication interface section, and may be in the form of being implemented by the protocol LSI 112B as shown in FIG. 11. In the configuration of the circuit board 110B having the protocol LSI 112B, the data transfer processing is controlled similarly to the first CHA 110.

The second CHA is same as the first CHA except the protocol LSI 112B. The data transfer LSI 114 and the protocol LSI 112B configure the DTC. The processor #1 (119), the protocol LSI 112B, the data transfer LSI 114, the memory controller #1 (116), the memory #1 (117), and the memory #3 (115) are communicably connected to the PCI buses, respectively, similarly to the first CHA. Also in the configuration of the second CHA 110, first to fourth control as discussed below are possible similarly to the first CH 110.

The protocol LSI 112B provides the communication interface function to communicate with the other apparatus 700, and configures the communication interface section. For example, the data to be transmitted to the other storage apparatus 600 is converted into the data format conforming to the FC protocol. The protocol LSI 112B and the connector 118 connected thereto function also as a port connected to the port of the FC switch configuring the SAN 500. In addition, the transmission/reception of the data with the other apparatus 700 is executed through a buffer memory the protocol LSI 112B has. The buffer memory that the protocol LSI 112B has corresponds to the second memory unit.

In accordance with an instruction from the processor #1 (119), the data transfer LSI 114 controls, as a target for the PCI bus, the data transfer between the CM 130 and the other apparatus 700 on the basis of an operation request from the PCI bus. Specifically, the data transfer LSI 114 reads, from the memory #1 (117), the data transfer information, which is stored in the memory #1 (117) by the processor #1 (119) and includes the data storage positions in the CMA 130 and the other apparatus 700, and executes its data transfer in accordance with the access from the PCI bus.

A PCI-bus space viewed from the protocol LSI 112B, i.e., a protocol-LSI memory space has a data space and a control space. The data space is associated with the data area shown in FIG. 5, and the script data associated with the P2 is stores therein. The control space is associated with a script area #2 for storing the P2 in the memory #1 (117) and the P2 is stored therein.

In the data space within the PCI bus space, the data to be transferred to the CM 130 or data having been transferred from the CM 130 is stored. Also, in the control space, the data transfer information such as a storage position and storage area size of each piece of data stored in the data space is stored as the P2 associated with each pieced of data. Similarly, in the data area of the CM 130, the data to be transferred to the data space in the PCI bus space or the data having been transferred from the data space is stored. In addition, the data transfer information on each piece of data stored in the data area is stored in the script area #1 of the memory #1 (117), as the P1 associated with each piece of data.

Figure 12:
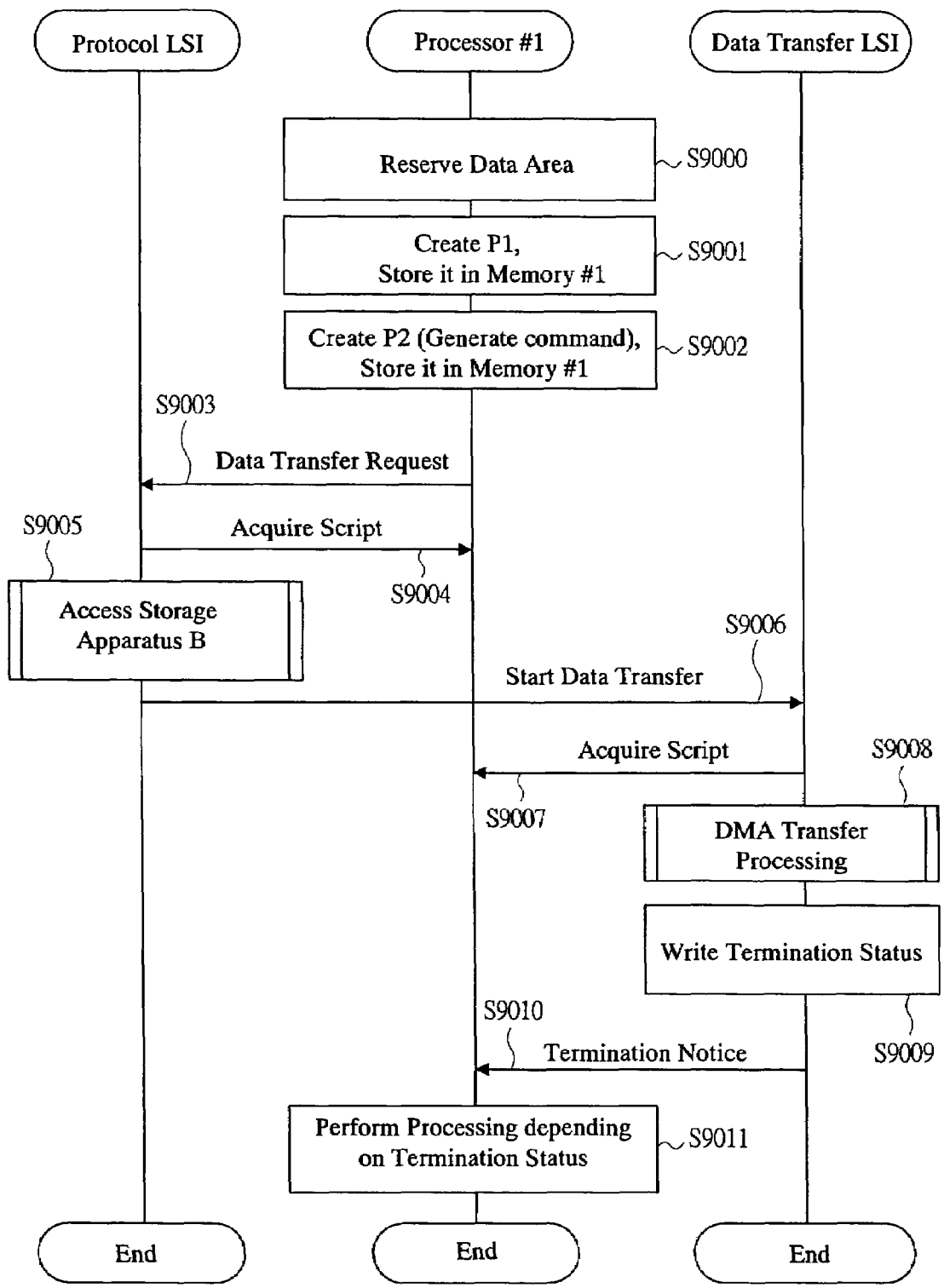
FIG. 12 is a flow diagram showing a data transfer processing in the second CHA in the storage apparatus according to the embodiment of the present invention.

FIG. 12 is a flow diagram showing a data transfer processing in the second CHA 110. A description will be made of a processing example when the first storage apparatus 601 receives a data read request stored in the second storage apparatus 602 from the information processor 200. First, when the first controller 101 receives the data read request from the information processor 200, the processor #1 (119) reserves data areas in the memory #1 (117) and the CM 130 (S9000). Reserving the data areas in the memory #1 (117) means to reserve the storage areas for storing the P1 and P2. In addition, reserving the data area in the CM 130 means to reserve the storage area for storing the read data. In this case, the data area to be reserved is not necessarily one.

Subsequently, the processor #1 (119) creates the P1 and stores the created P1 in the memory #1 (117) (S9001). In the P1, the address of the CM 130 is stored as the transmission-destination address of the data. Then, the processor #1 creates the P2 and stores the created P2 in the memory #1 (117) (S9002). In the P2, the PCI address is stored as the transmission-source address of the data.

Then, the processor #1 (119) makes a data transfer request by transmitting the number of the P2 to the protocol LSI 112B (S9003). In accordance with the data transfer request, the protocol LSI 112B reads the P2 from the memory #1 (117) and acquires it (S9004) and communicates with the second storage apparatus 602 through the SAN 500 in accordance with the P2 (S9005). Through the communication, the protocol LSI 112B transmits a data read request to the second storage apparatus 602. Then, after the read data is transmitted from the second storage apparatus 602, the protocol LSI 112B starts the data transfer by transmitting the read data in which the PCI address is set as a transmission destination (S9006).

Meanwhile, the processor #1 (119) transmits the number of the P1 to the data transfer LSI 114. By doing so, based on the number of the P1, the data transfer LSI 114 reads and acquires the P1 from the memory #1 (117) (S9007). Then, in response to an operation of the PCI bus, the data transfer LSI 114 starts, as a target, the DMA transfer processing (S9008) to the CM 130 in accordance with the P1. The DMA transfer processing (S9008) is the same as the processing described for the first CHA.

When the DMA transfer processing (S9008) ends, the DMAC 801 writes, into the memory #1 (117), the termination status in which results of the transfer processing are described (S9009), and gives the processor #1 (119) a termination notice (S9010). Then, the processor #1 (119) reads the termination status from the memory #1 (117) and executes a processing corresponding to the contents thereof (S9011).

Now, similarly to the DMA units 800 of the first CHA, the DMA units 800 in the second CHA 110 can also control the memory #3 (115), i.e., control the data transfer using the data transfer information and the saving or recovery of the data, and process the plurality of data transfers in a multiplex manner. Thus, the same effects as those of the first CHA can be obtained. For example, since an access from the protocol LSI 112B to the second storage apparatus 602 in the S9005 requires relatively long time, a plurality of data read requests can be transmitted to the second storage apparatus 602 during the above time. In addition, the plurality of pieces of read data transmitted in accordance with each piece of data read request can also be received. At this time, the plurality of pieces of divided data (data blocks) can be received for one data read request.

<Multiprocessing of Data Transfer—Basic Operations>

Figure 13:
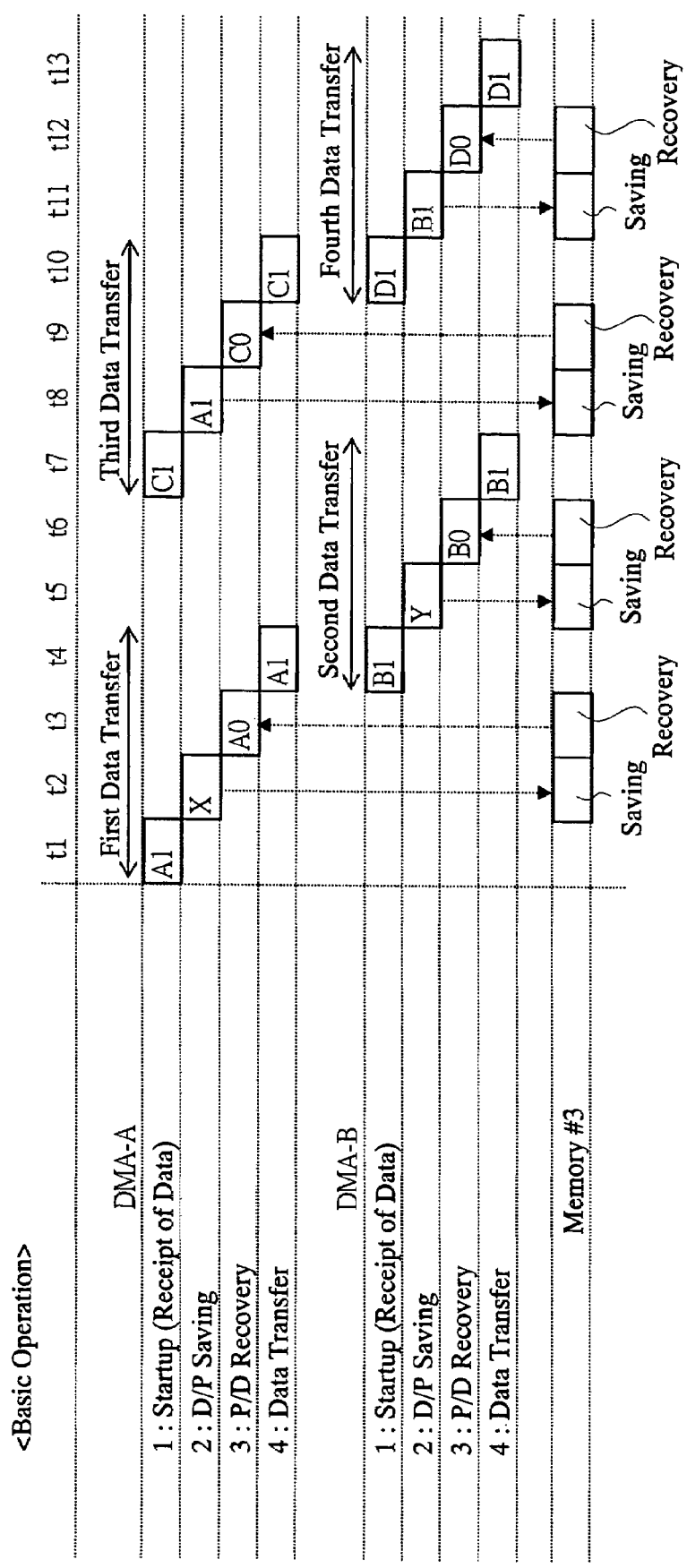
FIG. 13 is a timing chart showing examples of basic operations in which multiprocessing of the data transfers in the data transfer LSI is performed in the storage apparatuses of the respective embodiments.

Next, the data transfers will be detailed based on the configuration of the storage apparatuses 600 as described above. FIG. 13 is a timing chart showing an example of basic operations involved in multiprocessing the data transfers of the data transfer LSI 114 in the storage apparatus 600 of each embodiment. This example shows the case where, in the configuration having two DMA units 800 (800A, 800B), the data transfers are controlled in parallel and the plurality of data transfers are multiprocessed by using the saving/recovering operation and switching the data transfers. In particular, there will be shown the case of executing the data transfer to the CM 130 in response to receipt of the data from the other apparatus 700 in the CHA 100. The term "DMA-A" represents the DMA unit #1 (800A) and "DMA-B" represents the DMA unit #2 (800B) on the other side. The "memory #3" shows the saving/recovering operations to the control area in the memory #3 (115) from the memory in the data transfer LSI 114, i.e., from the register 807 or the buffer 810. The word "Saving" refers to a saving operation and "Recovery" refers to a recovering operation. The DMA-A and DMA-B execute respective processes of: "1: Startup (data reception)"; "2: Saving of data (D)/parameter (P)"; "3: Recovery of parameter (P)/data (D)"; and "4: Data transfer". The DMA-data transfer processing in the DMA unit 800 is started by the data reception. The above data (D) corresponds to the transfer data and the above parameter (P) the data transfer information. In addition, the symbols "A1", "B1", "C1", "D1", "X", and "Y", etc. represent data to be a unit of one data transfer, data transfer information for the data transfer, or a pair of the data transfer information and the data (hereinafter simply referred to as a pair), and correspond to the data blocks, for example. Note that, in the saving operation, only the data transfer information is saved depending on the situation. The symbols "A0", and "A1", etc. represent sequential data of the same series, and are a plurality of data blocks into which, for example, certain data A is divided. This embodiment shows an example of first to fourth data transfers corresponding to the case where data is received in order of A1, B1, C1, and D1 in the CHA 110. The symbol "t1" etc. represents the timing of the processing.

First, the first data transfer is executed. In response to receipt of the data A1, the processor #1 (119) instructs the data transfer LSI 114 to start the data transfer, and starts one of the DMA units 800 (t1). In this embodiment, the case the data transfer LSI 114 starts a DMA-A side in respond to the instruction is shown. The DMAC 801A of the started DMA-A saves, into the control area #1 of the memory #3 (115), a pair of parameters and data (X), which is used in one before the data transfer processing having been previously performed and remains in the register 807 and the buffer 810, (t2). For example, the data and parameters are saved in this order. After the saving, the DMAC 801A recovers the pair of parameters and data (A0), which is necessary for a transfer of the data A1 and has been saved previously, from the memory #3 (115) into each of the register 807A and the buffer 810A (t3). For example, the parameters and data are saved in this order. Then, while the recovered pair (A0) is used, the DMAC 801A executes the data transfer for the data A1 through the buffer 810A. For example, in the case of the data write from the other apparatus 700, the DMA unit 800 transfers the write data from a side of the memory #2 (113) of the processor #2 (112) to a side of the CM 130. In this embodiment, the DMAC 801A transfers the data A1 from the memory #2 (113) to the buffer 810A. After the data transfer ends, the DMA units 800 gives a termination notice to the processor #1 (119). Note that if the data transfer to be executed is a transfer of first data (e.g., data blocks) in a certain series of data transfers, for example, the data transfer information based on the script is newly created rather than recovery.

Next, a second data transfer is executed. Since the two DMA units 800 are provided, the first data transfer is executed by using one of the DMA units 800 and, in parallel therewith, the second data transfer is executed by using the other of the DMA units 800. If the DMA-A receives data B1 (t3) during a processing of the first data transfer and if the second data transfer is started, the DMA-B is started and, similarly to the first data transfer, a pair (Y) remaining in the memory of the DMA-B is saved into the memory #3 (115) (t5) and a pair (B0) necessary for the second data transfer is recovered, whereby a transfer for data B1 is executed (t7).

In addition, a third data transfer is executed. When data C1 is received during the processings of the first and second data transfers (t7), one of the DMA units 800, i.e., the DMA-A in this case is started and similarly the data transfer is executed in order to execute the third data transfer. The DMA-A saves, in the memory #3 (115), the pair (A1) for the first data transfer remaining in the memory during the processing (t8), and a pair (C0) necessary for the third data transfer is recovered (t9) and the data transfer of the data C1 is executed (t10).

In addition, a fourth data transfer is executed. When the data D1 is recovered (t10), the DMA-B opposite to the DMA-A is started during the processing of the third data transfer and thereby the pair (B1) being processed therein is saved (t11) and a pair (D0) necessary for the fourth data transfer is saved (t12) and a transfer of data D1 is executed (t13).

Thus, by using the saving/recovering operation, the DMA-A executes the first and third data transfers sequentially and the DMA-B executes the second and fourth data transfers sequentially. The respective data transfers may be a processing of the same or different series of data. For example, irrespective of contents of the transfer data, the processing for using an empty DMA unit 800 for every transfer request is possible. In addition, the data transfer LSI 114 can control the plurality of data transfers by determining that the DMA-A processes a first series of data A and that the DMA-B processes a second series of data B. Similarly, the data transfer processing whose multiplicity is further enhanced is possible by saving/recovering the pair of the data transfer information of the data involved in the plurality of pieces of data transfers and by holding it in the memory #3 (115). In addition, when the communication between the first and second storage apparatuses 601, 602 is established, that is, when the data transfer is executed in the units of the data block, conforming to the FC protocol, respective data blocks in transferring a plurality of different series of data coexist, whereby the data transfer is processed. In the system including a plurality of storage apparatuses 600, further more data blocks coexist. Even in such a case, by executing the saving/recovery to the memory #3 (115) so as to correspond to the respective data transfers, the data transfer processing can be executed in a multiplex manner.

As shown in the sequence of FIG. 9 by such basic operations, another data transfer can be started in one of the DMA units 800 without waiting for the end of the first data transfer. For example, in the case where the data stored in the storage volume 310 of the second storage apparatus 602 is read from the first storage apparatus 601 two or more time, a second data read request may be transmitted to the controller 102 before the data to be read in response to the first data read request sent to the second controller 102 from the first controller 101 is transmitted to the controller 101, or before transmission of all the data blocks is completed also after the data to be read is transferred to the controller 101. In this case, the first data transfer information corresponding to the first data read request is stored in the register 807 of the data transfer LSI 114 when the second read request is sent. However, by the saving to the memory #3 (115), the data transfer information corresponding to the second data read request is read to the register 807, whereby the second data transfer can be executed. Then, when the data read from the storage volume 310 of the second storage apparatus 602 is received in response to the first data read request, the data involved in the first data read may be received by saving, into the memory #3 (115), the second data transfer information stored in the register 807 and by reading again, to the register 807, the first data transfer information saved in the memory #3 (115).

In addition, for example, other data transfers can be executed during a transfer waiting time in which the data transfer is executed between the first controller 101 and the second controller 102. Also, for example, in the case where the read data is not stored in the CM 130 of the second controller 102 in the above data reading, i.e., in the case of cache mishit, the other data transfers can be executed while the data is read from the storage volumes 310. Thus, since throughput thereof can be improved by the multiprocessing of the data transfers, the data input/output performance can be enhanced.

In the above basic operations, the DTC can multiprocess the plurality of data transfers, by controlling the data transfer while storing the data transfer information or the data in the memory the DTC has or by performing the saving/recovering operations of the data transfer information or the data to another memory #3 (115). However, a load of the saving/recovering operations influences the data input/output performance.

<Basic Operations at Cache Write>

Figure 14A:
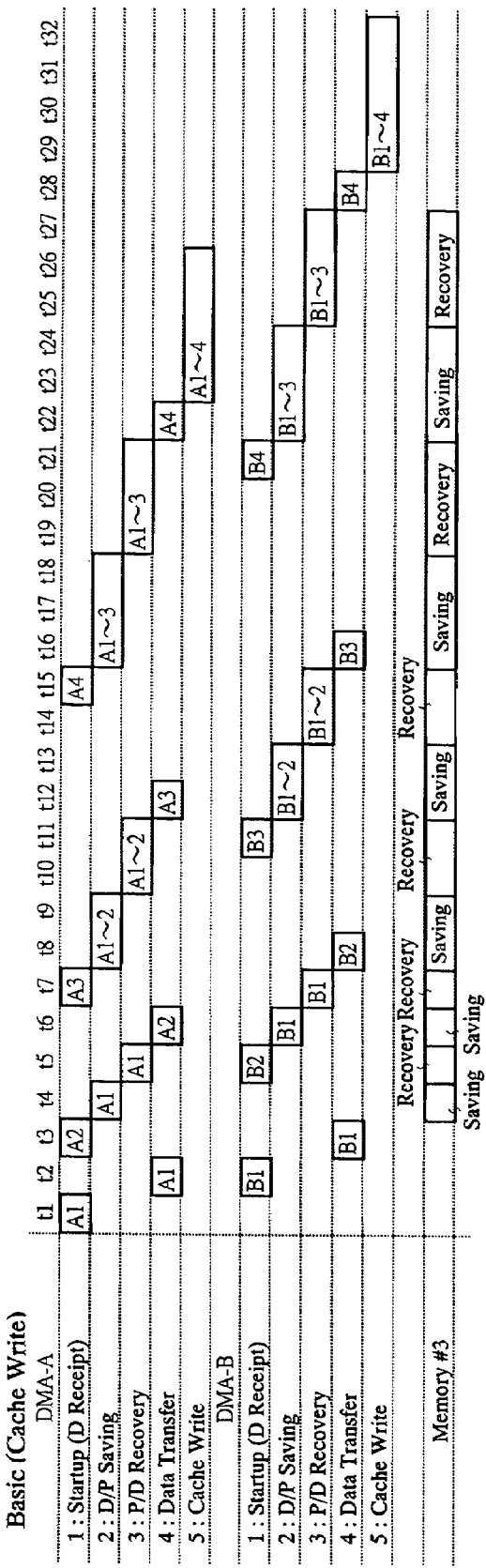
FIG. 14A is a timing chart showing a processing example of the basic operations performing the multiprocessing of the data transfers at a time of cache write, in the storage apparatus according to the embodiment of the present invention.
Figure 14B:
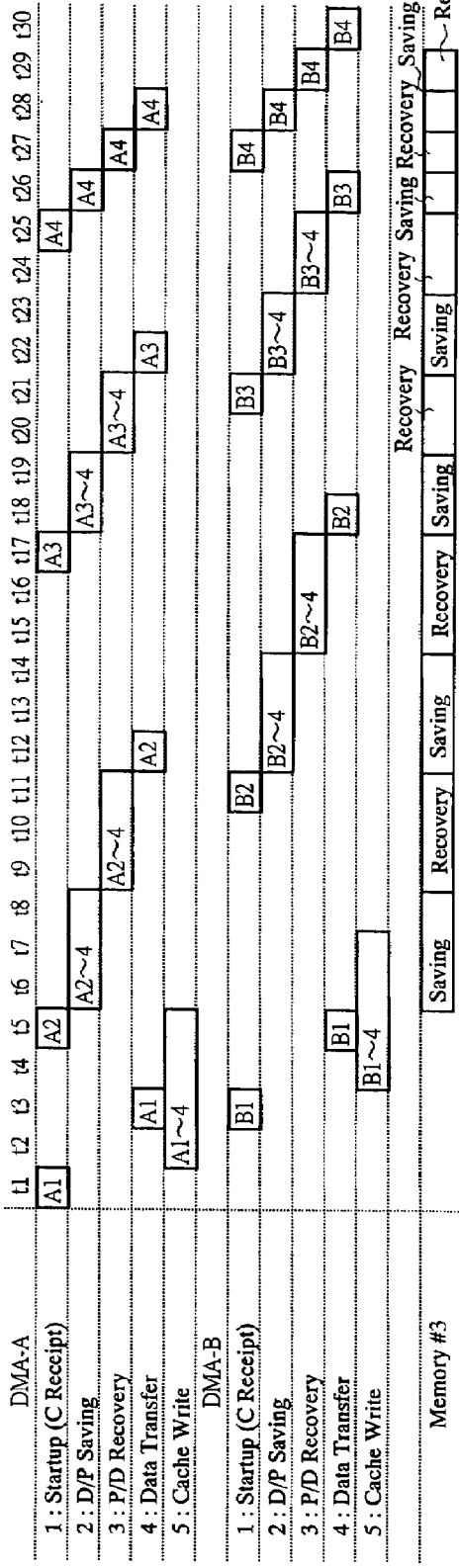
FIG. 14B is a timing chart showing a processing example of the basic operations performing the multiprocessing of the data transfers at a time of cache read, in the storage apparatus according to the embodiment of the present invention.

FIGS. 14A and 14B are timing charts showing processing examples of basic operations at cache write and cache read, which are involved in multiprocessing the data transfers. In consideration of a configuration including the connection unit 150 in the controller 100, executing together the plurality of data transfers in the data write process and the data read process from the CHA 110 to the CM 130 becomes effective. For example, reading/writing to the CM 130 is executed in the units of the plurality of data blocks. For example, one data block has the size of 2 kb, and the reading/writing to the CM 130 is executed in the units of the data having a size of 8 kb.

FIG. 14A shows the processing example of the basic operation at the cache write. This embodiment shows the case where the DMA-A and DMA-B execute respective transfers of data A1 to A4 and data B1 to B4 and where four data blocks are written to the CM 130 together. It shows the case where the CHA 110 receives data A1, B1, A2, B2, A3, B3, A4, and B4 in this order. The data A1 and B1 is first data blocks in the same series of data A and B, respectively.

To write the data into the CM 130, writing into the CM 130 is executed after the four pieces of data A1 to A4 are accumulated in the buffer 810 of the DMA unit 800. However, loads due to the saving and recovering processings in that period are increased.

First, in response to receipt of the data A1, the first data transfer by the DMA-A is started up (t1). The data A1 is transferred from the memory #2 (113) to the buffer 810A (t2). Similarly, in response to receipt of the data B1, the DMA-B is started (t2), and the DMAC 801B transfers the data B1 from the memory #2 (113) to the buffer 810B (t3).

Then, in the case of receiving the data A2 (t3), the above basic operation is to save a pair of data transfer information and data for the data A1 from the memory of the DMA unit 800 to the memory #3 (115), to recover the pair of data transfer information and data for the data A1 from the memory #3 (115) to the memory of the DMA unit 800, and then to transfer the data A2 (t3 to t6). Then, similarly also to the next data B2, the DMA-B executes a processing including the saving and recovery (t5 to t9). Similarly also to the following data A3 and B3, each of the DMA-A and DMA-B executes the processing including the saving and recovery (t7 to t12 and t11 to t16).

Then, in the case of receiving the data A4 (t15), the pairs of data transfer information and data for the data A1 to A3 in the DMA-A are saved from the memory of the DMA-A to the memory #3 (115) and recovered from the memory #3 (115) to the memory of the DMA-A, and then the transfer to the data A4 is executed (t15 to t22). Then, when the four data blocks of the data A1 to A4 are accumulated in the buffer 810A, the DMAC 801A of the DMA-A writes the data A1 to A4 from the buffer 810A to data areas that is the transfer destinations in the CM 130 (t23 to t26). Similarly also to the next data B4, the DMA-B executes the processing until the writing to the CM 130 (t21 to t32).

As discussed above, in the case of the continuous data transfers of the same series of data (e.g., data A and B) in the DMA unit 800 at the cache write, for example, in the case where the plurality of pieces of data blocks configuring sequential data are transferred, if the basic operation is performed, the loads from the saving and recovering operations are increased. Therefore, in order to reduce the load at the cache write in the third control, that is, as shown below, when the plurality of pieces of data such as the same series of contiguous data are written into the CM 130, the data is written to the CM 130 without executing saving and recovery for the respective data transfers every time one data transfer is executed.

<Basic Operations at Cache Read>

FIG. 14B shows the operating example of the basic operation at the cache read. The embodiment shows the case where the DMA-A and DMA-B execute transfers of data A1 to A4 and data B1 to B4, respectively and where four data blocks are read from the CM 130 together and transferred to the other apparatus 700. It shows the case where the CHA 10 sends out the same data as that at the cache write.

When reading the data from the CM 130, the data transfer LSI 114 reads together the data A1 to A4 once, accumulates them in the DMA units 800, and transfers each piece of data individually to the memory #2 (113). However, the loads from the saving and recovering processings in that period are increased.

First, in response to reception of a command (C) for transferring the data A1, the first data transfer in the DMA-A is started (t1). The DMAC 801A of the DMA-A consecutively reads the data A1 to A4 from the CH 130 and accumulates them in the buffer 810A (t2 to t5). Then, the DMAC 801A transfers the data A1 from the buffer 810A to the memory #2 (113) (t3). Similarly, the DMA-B is started to transfer the data B1 (t3), the data B1 to B4 are read from the CM 130 and accumulated in the buffer 810B (t4 to t7), and the data B1 is transferred to the memory #2 (113) (t5).

Then, the DMA-A is started by transferring the data A2 (t5), and pairs of data transfer information and data for the data A2 to A4 are saved from the memory of the DMA-A to the memory #3 (115) and the recovery from the memory #3 (115) to the memory of the DMA-A is executed, and thereafter the data A2 is transferred (t5 to t12). Similarly also to the next data B2, the DMA-B executes the processing including the saving and recovery (t11 to t18). In addition, similarly also to the next data A3 and B3, each of the DMA-A and DMA-B executes the processings including the saving and recovery (t7 to t22 and t21 to t26).

Next, in the case of transferring the data A4 (t25), the pair of data transfer information and data for the data A4 in the DMA-A is saved to the memory #3 (115), the recovery from the memory #3 (115) is executed, and thereafter the transfer of the data A4 is executed (t25 to t28). Thereby, the transfers of the data A1 to A4 accumulated in the buffer 810A to the memory #2 (113) are completed, and the transfers to the data areas in the memory of the other apparatus 700, which are transfer destinations, is also executed. Similarly also to the next B4, the DMA-B executes the processing (t27 to t30).

As discussed above, when the DMA unit 80 executes the continuous data transfers of the same series of data (e.g. data A and B), for examples the transfers of the plurality of data blocks configuring the sequential data at the cache read, the loads due to the saving and recovering operations are increased if the above basic operation is performed. Therefore, in order to reduce the loads at the cache read in the fourth control, when the plurality of pieces of data such as the same series of continuous data are read from the CM 130, the data is re-read from the CM 130 to the buffer 310 without executing the saving and recovery whenever one data transfer is executed, thereby being transferred.

First Embodiment

Next, the storage apparatus 600, which is a first embodiment, will be described. The basic operation represents control for performing the saving and recovering operations of the data transfer information and the data whenever the data transfer is executed. However, if the saving and recovery are executed often, loads due to executions of them are increased. In the storage apparatus 600 of each embodiment, the basic operations can be performed and concurrently it is possible to efficiently use the memory of the DMA unit 800 by the data transfer LSI 114 and control the data transfers in which the loads required for the saving and recovery are reduced by controlling the timing of the saving and recovering operations. In addition, a number of control methods can be selectively executed depending on the conditions. The first to fourth control in which the loads involved in the saving and recovery are reduced will be described below.

First, the storage apparatus of the first embodiment is configured so that the DTC in the controller 100 has two DMA units 800, wherein for the data transfer information and the data stored in the DMA units 800, the data transfer control of advance saving to another memory #3 (115) is executed as the first control.

<1: Control of Advance Saving>

The data transfer control executing the advance saving will be described as the first control. As the first control, the data transfer LSI exercises such control that the memory in one of the DMA units 800, i.e., the register 807 and the buffer 810 are kept empty always or as far as possible for future data transfers. Therefore, the control for saving the data transfer information or the data to the memory #3 (115) in advance rather than at the timing of the data reception etc is executed. Thereby, the necessary time from the start to the end of the data transfer is shortened. Due to the start of the data transfers by the processor #1 (119) and the data transfer LSI 114, one of the DMA units 800 executes the recovery and the data transfer and concurrently the other of the DMA units 800 executes the saving in advance.

In this embodiment, while the memory in one of the DMA units 800, e.g., the register #1 (807A) and the buffer #1 (810A) in the DMA unit #1 (800A) are used for the data transfers, the saving is executed in advance for the memory in the other of the DMA units 800, i.e., the register #2 (807B) and the buffer #2 (810B) in the DMA unit #2 (800B). In other words, before the DMA unit #2 (800B) starts the next data transfer, the pair of the data transfer information and the data remaining in the memory are saved into the memory #3 (115). For example, due to the fact that the DMA unit #1 (800A) starts executing the third data transfer in the case where the DMA unit #1 (800A) executes the first data transfer and the DMA unit #2 (800B) executes the second data transfer, the pair for the second data transfer from the memory in the DMA unit #2 (800B) are saved, whereby the fourth data transfer for the future is prepared.

FIGS. 15A and 15B show the first control and the second control. FIG. 15A is a timing chart showing an example of the first control. This embodiment has such a configuration to have two DMA units 800 and shows the case of controlling the advance saving in which the basic operations are improved. In particular, it shows the case where the CHA 110 receives the data. The DMA-A and DMA-B perform respective processings for startup (receipt of data), D/P saving, P/D recovery, and data transfers. The embodiment shows an example of the first to fourth data transfers corresponding to the case where the CHA 110 receives the data in order of A1, B1, C1 and D1, respectively. Arrows indicate that other processings start being performed due to a certain processing.

First, the first data transfer is executed. In response to receipt of the data A1, the processor #1 (119) instructs the data transfer LSI 114 to start executing the data transfer, thereby starting one of the DMA units 800, e.g., the DMA-A in this case (t1). The started DMAC 801A in the DMA-A recovers, from the control area #1 of the memory #3 (115), the pair of data transfer information and data (A0) necessary for transferring the data A1 (t2) and executes the data transfer (t3). Then, due to the receipt of the data A1, the data transfer LSI 114 makes the data transfer executed by the DMA-A and makes a side of the other DMA-B saved. The DMAC 801B of the DMA-B saves, to the control area #2 in the memory 3 (115), the pair (Y) of data transfer information and data used in one before the past data transfer processing stored in the register 807B and the buffer 810B. The data transfer LSI 114 concurrently executes the recovery of the pair (A0) and the transfer of the data A1 in the DMA-A and the saving of the pair (Y) in the DMA-B. The embodiment shows in particular the case where: the recovery of the pair (A0) in the DMA-A is made at the timing of t2; the transfer of the data A1 in the DMA-A is executed at the timing of t3 and simultaneous the pair (Y) in the DMA-B is saved. The processings in the memory #3 (115) are performed in order of saving and recovery. Note that although this embodiment shows the case of performing the processing in parallel, the timing of recovery, data transfer, and saving may be varied depending on the condition such as the case where there are any processings to be performed in advance.

Then, the second data transfer is executed. After the transfer of the data A1, the data B1 is received. In response thereto, the DMA-B on the other side is started (t4). Similarly to the first data transfer, the DMAC 801B of the DMA-B recovers, from the memory #3 , the pair (B0) necessary for transferring the data B1 (t5), and executes the transfer of the data B1 (t6). When the DMA-B transfers the data B1, execution of the saving is not needed because the saving has been already executed in advance. Then, concurrently with the transfer of data B1, the DMA-A saves it. The DMA-A saves, into the memory #3 (t6), the pair (A1) used for the transfer of the data A1 and stored in the memory.

Then, the third data transfer is executed. After the transfer of the data B1, the data C1 is received. In response thereto, the DMA-A is started (t7). Similarly to the first data transfer, the DMAC 801A of the DMA-A executes the recovery (t8) and the data transfer (t9) for the data C1 and concurrently the DMA-B saves the transfer of the data B1 (t9). Thereafter, the fourth data transfer is executed similarly.

Thus, by the first control, one of the DMA units 800 executes the data transfer and the other of the DMA units 800 saves it in advance. Therefore, the time necessary for the entire processings can be shortened because the saving has already been done at the time of staring the next data transfer. The first control can be similarly executed even when three or more DMA units are involved.

<First Control at Cache Write>

FIGS. 16A and 16B show the case where the first control is exercised at cache write and at cache read. FIG. 16A is a timing chart showing a processing example of the first control executed at the cache write. It shows the case where four data blocks are together written from the buffer 810 of the DMA unit 800 of the data transfer LSI 114 to the CM 130.

Upon receipt of the data A1, the DMA-A is started (t1), and the DMAC 800A transfers the data A1 to the buffer 810A (t2). Next, upon receipt of the data B1, the DMA-B is started (t2), and the DMAC 801B transfers the data B1 to the buffer 810B (t3). In response thereto, the DMA-A saves, into the memory #3 (115), the pair (A1) stored in the memory (t3).

Then, upon receipt of the data A2, the DMA-A is started (t3), and the DMAC 801A recovers, from the memory #3 (115), the pair (A1) necessary for transferring the data A2 (t4). Then, the data A2 is transferred (t5). Concurrently therewith, the DMA-B saves, into the memory #3 (115), the pair (B1) stored in the memory (t5).

Then, upon receipt of the data B2, the DMA-B similarly executes recovery of the pair (B1) (t6) and transfer of data B2 (t7), and the DMA-A concurrently saves the pairs (A1 to A2) (t7 to t8). Then, upon receipt of the data A3 (t7), the DMA-A similarly executes recovery of the pairs (A1 to A2) (t9 to t10) and transfer of the data A3 (t11), and the DMA-B concurrently saves the pairs (B1 to B2) (t11-t12). Then, upon reception of the data B3 (t11), the DMA-B similarly executes recovery of the pairs (B1 to B2) (t13 to t14) and transfer of the data B3 (t15), and the DMA-A concurrently executes saving of the pairs (A1 to A3) (t15 to t17). Then, upon receipt of the data A4 (t15), the DMA-A similarly executes recovery of the pairs (A1 to A3) (t18 to t20) and transfer of the data A4 (t21), and the DMA-B concurrently saves the pairs (B1 to B) (t21 to t23). Furthermore, since the DMA-A has accumulated the data A1 to A4 in the buffer 810A, the DMAC 801A consecutively writes the data A1 to A4 to the data areas in the CM 130 from the buffer 810A (t22 to t25). Then, upon receipt of the data B4 (t21), the DMA-A similarly executes recovery of the pairs (B1 to B3) (t24 to t26), and transfer of the data B4 (t27). Further, since the DMA-B has accumulated the data B1 to B4 in the buffer 810B, the DMAC 801B consecutively writes the data B1 to B4 to the data areas in the CM 130 from the buffer 810B (t22 to t25). Thus, while the DMA units 800 execute the advance savings of the data transfer information and the data, the cache write processing to the CM 130 can be executed, so that the processing time is reduced in comparison with the basic operations.

If the processing for writing together the data to the CH 130 is executed, there is an advantage of having good processing efficiency in the connection unit 150 such as a crossbar switch. Thereby, for example, there ia an advantage of performing the good processing efficiency when the data is written from the information processor 200 to the storage volume 310.

<First Control at Cache Read>

FIG. 16B is a timing chart showing a processing example of the first control executed at the cache read. It shows the case where the DMA unit 800 of the data transfer LSI 114 reads together the four data blocks from the CH 130 to the buffer 810.

The DMA-A is started for transferring the data A1 (t1), and the DMAC 801A consecutively reads the data A1 to A4 from the CH 130 to the buffer 810A (t2 to t5). Then, the data A1 is transferred from the buffer 810A to the memory #2 (113) (t3). Then, the DMA-B is started by transferring the data B1 (t3), and the DMAC 801B reads the data B1 to B4 from the CM 130 to the buffer 810B (t4 to t7). Then, the data B1 is transferred from the buffer 810B to the memory #2 (113) (t5). In addition, in response to the transfer of the data B1, the DMA-A concurrently saves, into the memory #3 (115), the pairs (A2 to A4) stored in the memory (t6 to t8).

Next, upon transfer of the data A2, the DMA-A is started (t5) and the DMAC 801A recovers, from the memory #3 (115), the pairs (A2 to A4) necessary for transferring the data A2 (t9 to t11). Then, the data A2 is transferred (t12). Concurrently therewith, the DMA-B saves, into the memory #3 , the pairs (B2 to B4) stored in the memory (115).

Then, upon transfer of the data B2, the DMA-B similarly executes recovery of the pairs (B2 to B4) (t15 to t17) and transfer of the data B2 (t18), and the DMA-A concurrently saves the pairs (A3 to A4) (t18 to t19). Then, upon transfer of the data A3 (t17), the DMA-A similarly executes recovery of the pairs (A3 to A4) (t20 to t21) and transfer of the data A3 (t22), and the DMA-B concurrently saves the pairs (B3 to B4) (t22 to t23). Then, upon transfer of the data B3, the DMA-B similarly executes recovery of the pairs (B3 and B4) and transfer of the data B3 (t26), and the DMA-A concurrently saves the pair (A4) (t26). Then, upon transfer of the data A4 (t25), the DMA-A similarly executes recovery of the pair (A4) and transfer of the data A4 (t28), and the DMA-B concurrently saves the pair (B4) (t28). Thereby, the transfers of the data A1 to A4 accumulated in the buffer 810A to the memory #2 (113) are completed. Then, upon transfer of the data B4 (t27), the DMA-B similarly executes recovery of the pair (B4) (t29) and transfer of the data B4 (t30), whereby the transfers of data B1 to B4 to the memory #2 (113) are completed. Thus, while the DMA unit 800 executes the advance savings of the data transfer information and the data, the cache read processing to the CM 130 can be performed, whereby the processing time is reduced in comparison with the basic operations.

There is an advantage of performing good processing efficiency processing to the connection unit 150 in the case of performing together the write processing of the data from the CM 130 similarly to the case of performing the write processing of (a). Thereby, for example, there is an advantage of having the good processing efficiency when the information processor 200 reads the data from the storage volumes 310.

Second Embodiment

Next, a description will be made of the storage apparatus 600 of a second embodiment. The storage apparatus 600 in the second embodiment exercises the second control for transferring the data.

<2: Control of Recovery Reduction>

As the second control, a description will be made of the data transfer control for performing recovery reduction. As the second control, the data transfer LSI 114 exercises the control for reducing the recovering operation by utilizing the data transfer information and the data remaining in the memory of the DMA units 800. In other words, in a certain DMA unit 800, when the second data transfer is related to the first data transfer after executing the first data transfer and the saving, that is, when the data transfer information and the data necessary for the second data transfer remain in the register 807 and the buffer 810 of the DMA units 800, the second data transfer is executed by omitting the recovering operations. Thereby, the time required from the start to the end of the data transfer is reduced. Note that the above processing is performed on the condition that the data transfer information or the data is copied into the memory #3 by the saving operation (115) and the same data transfer information or the data is left in the register 807 or the buffer 810. The data transfer information or the data remaining in the memory of the DMA units 800 can be used as long as it is not erased by being overwritten. Although the second control can be used independently, this embodiment shows the case where the second control is combined with the first control.

FIG. 15B is a timing chart showing an example of the second control. The embodiment has such a configuration of having the two DMA units 800 and shows the control for reducing the recovering operation in addition to the advance saving operation. It shows receipt of the data in particular. This embodiment shows an example of transferring the first to fourth data corresponding to the case where the CHA 110 has received the data in order of A1, B1, A2, and B2.

First, the first data transfer is executed. In response to receipt of the data A1, similarly to the first control shown in (a), control of the data transfer and advance saving is exercised (t1 to t3). Similarly, the second data transfer is executed (t4 to t6).

Then, the third data transfer is executed. After transferring the data B1, the data A2 is received (t7). In response thereto, the DMA-A is started. At this time, if the first control is executed, recovery of the pair of data transfer information and data necessary for transferring the data A2 is executed. However, in the second control, since the necessary pair (A1) remains in the register 807A and the buffer 810A of the DMA unit #1 (800A), the recovery thereof becomes unnecessary. Therefore, the pair (A1) stored in the memory as it stands is used to transfer the data A2 (t8). In addition, according to the first control, the DMA-B on the other side saves the data B1 (t8). By the data transfer LSI 114, the DMA-A transfers the data A2 at the timing of t8 and concurrently the DMA-B executes the saving for the data B1. Since the received data A2 is sequential data following the data A1, the data transfer LSI 114 starts the DMA-A side where the pair (A1) remains in the memory. Thereafter, since the data B2 is received (t10) and the pair (B1) for the data B2 remains in the memory of the DMA-B, the data B2 as it is without recovery thereof in the DMA-B is similarly transferred (t11).

Thus, in the second control, when the data transfer LSI 114 executes relevant consecutive data transfers, for example, when the same series of sequential data is transferred, the data transfer information and the data retained in the memory of the DMA units 800 are used as they are, so that the recovering operation is omitted and the time required for the entire processing is reduced. The second control can be similarly adopted even in the case of a configuration of having three or more DMA units.

<Second Control at Cache Write>

FIGS. 17A and 17B shows the case where the second control is exercised at the cache read and at the cache write. FIG. 17A is a timing chart showing a processing example of executing the second control at the cache write. It shows the case where four data blocks are together written to the CM 130 from the buffer 810 of the DMA unit 800 of the data transfer LSI 114.

Upon receipt of the data A1, the DMA-A is started (t1), and the DMAC 801A transfers the data A1 to the buffer 810A (t2). Then, upon receipt of the data B1, the DMA-B is started (t2) and the DMAC 801B transfers the data B1 to the buffer 810B (t3). In response thereto, the DMA-A saves, into the memory #3 (115), the pair (A1) stored in the memory (3t).

Then, upon receipt of the data A2, the DMA-A is started (t3), and the DMAC 801A transfers the data A2 without recovery thereof (t4) because the pair (A1) required for transferring the data A2 is stored in the memory. Concurrently with this, the DMA-B saves the pair (B1) stored in the memory into the memory #3 (115).

Then, upon receipt of the data B2 (t4), the DMA-B similarly transfers the data B2 without recovering the pair (B1) (t5) and the DMA-A concurrently saves the pairs (A1 to A2) (t5 to t6). Then, upon receipt of the data A3 (t5), the DMA-A similarly transfers the data A3 without recovering the pairs (A1 and A2) (t7), and the DMA-B concurrently saves the pairs (B1 and B2) (t7 and t8). Then, upon receipt of the data B3 (t7), the DMA-B similarly transfers the data B3 without recovering the pairs (B1 and B2) (t9), and the DMA-A concurrently saves the pairs (A1 to A3) (t9 to t11). Then, upon receipt of the data A4 (t9), the DMA-A similarly transfers the data A4 without recovering the pairs (A1 to A3) and the DMA-B concurrently saves the pairs (B1 to B3) (t12 to t14). Further, the DMAC 801A consecutively writes the data A1 to A4 into the data areas in the CM 130 from the buffer 810A since the DMA-A has accumulated the data A1 to A4 in the buffer (t13 to t16). Then, upon receipt of the data B4 (t12), the DMA-A similarly transfers the data B4 without recovering the pairs (B1 to B3) (t15). Furthermore, the DMAC 801B consecutively writes the data B1 to B4 into the data areas in the CM 130 from the buffer 810B since the DMA-B has accumulated the data B1 to B4 in the buffer 810B (t16 to t19). Thus, while the DMA units 800 executes the advance saving and the recovery reduction of the data transfer information and the data, the cache write processing to the CM 130 can be executed, whereby the processing time is reduced in comparison with the basic operations.

<Second Control at Cache Read>

FIG. 17B is a timing chart showing a processing example of executing the second control at the cache read. It shows the case where the four data blocks are together read from the CM 130 to the buffer 810 by the DMA unit 800 of the data transfer LSI 114.

The DMA-A is started for transferring the data A1 (t1), and the DMAC 801A consecutively reads the data A1 to A4 from the CM 130 to the buffer 810A (t2 to t5). Then, the data A1 is transferred to the memory #2 from the buffer 810A (t3). Then, upon transfer of the data B1, the DMA-B is started (t3), and the DMAC 801B reads the data B1 to B4 from the CM 130 to the buffer 810B (t4 to t7). Then, the data B1 is transferred from the buffer 810B to the memory #2 (113) (t5). In addition, in response to receipt of the data B1, the DMA-A concurrently saves the pairs (A2 to A4) stored in the memory into the memory #3 (115) (t6 to t8).

Then, upon transfer of the data A2, the DMA-A is started (t5), and the DMAC 801A transfers the data A2 by using the pairs (A2 to A4) stored in the memory as it is without recovering the pairs (A2 to A4) necessary for the transferring the data A2 (t9). Concurrently with this, the DMA-B saves the pairs (B2 to B4) stored in the memory into the memory #3 (115) (t9 to t11).

Then, upon transfer of the data B2 (t8), the DMA-B similarly transfers the data B2 without recovering the pairs (B2 to B4) (t12), and the DMA-A concurrently saves the pairs (A3 and A4) (t12 and t13). Then, upon transfer of the data A3 (t11), the DMA-B similarly transfers the data A3 without recovering the pairs (A3 and A4) (t14), and the DMA-B concurrently saves the pairs (B3 and B4) (t14 and t15). Then, upon transfer of the data B3 (t13), the DMA-B similarly transfers the data B3 without recovering the pairs (B3 and B4) (t16), and the DMA-A concurrently saves the pair (A4) (t16). Then, upon transfer of the data A4 (t15), the DMA-A similarly transfers the data A4 without recovering the pair (A4) (t17), and the DMA-B concurrently saves the pair (B4) (t17). Thereby, the transfers of the data A1 to A4 accumulated in the buffer 810 A into the memory #2 (113) are completed. Then, upon receipt of the data B4 (t16), the DMA-B similarly transfers the data B4 without recovering the pair (B4) (t18), whereby the transfers of the data B1 to B4 to the memory #2 (113) are completed. Thus, while the DMA unit 800 is executing the advance saving and the recovery reduction of the data transfer information and the data, the cache read processing to the CM 130 can be executed, whereby the processing time is reduced in comparison with the basic operations.

Third Embodiment

Next, a storage apparatus 600 of a third embodiment will be described. The storage apparatus 600 in the third embodiment executes the third control for transferring the data.

<3: Third Control at Cache Write>

As the third control, a description will be made of data transfer control for reducing the saving/recovering operations at the cache write. As the third control, in executing the data transfers by the DMA units 800, that is, when the plurality of pieces of data are transmitted to the CM 130 from the memory #2 (113) and the writing processing is performed, the data transfer LSI 114 writes (flushes) the transfer data from the buffer 810 to the CM 130 without executing the saving and recovery to the memory #3 (115) in each of the data transfers. Thereby, the saving and recovering operations are reduced. Due to the data transfer in one of the DMA units 800 in the data transfer LSI 114, the other of the DMA units 800 flushes the data from the buffer 810 to the CM 130.

FIGS. 18A and 18B show the third and fourth control. FIG. 18A is a timing chart showing a processing example of the third control. Note that FIG. 18A shows the case where the data {A1, B1, A2, B2, . . . } are received at the shortest timing.

In response to receipt of the data A1, the DMA-A is started (t1) and the DMAC 801A transfers the data A1 from the memory #2 (113) to the buffer 810A. Then, upon receipt of the data B1, the DMA-B is started (t2), and the DMAC 801B similarly transfers the data B1 from the memory #2 (113) to the buffer 810B. Then, upon receipt of the data A2, the DMA-A is started (t3). At this time, if the basic operations are performed, the pair (A1) stored in the memory is saved and the pair (A1) necessary for transferring the data A2 is recovered. However, if the third control is executed, such saving and recover is not executed. In the third control, in response to the receipt of the data B1 and startup of the data transfer by the DMA-B, the other DMA-A writes the data A1 from the buffer 810A to the CM 130 instead of saving it (t3). Then, since the pair (A1) of data transfer information and data used in the transfer of the data A1 remains in the memory of the DMA-A, the transfer of data A2 can be controlled by using the remaining as it is. Then, in response to receipt of the data B2 (t3), the DMA-B similarly writes the data B1 from the buffer 810B to the CM 130 instead of saving it (t4). The control to be executed after the data A3 and B3 is also the same.

Thus, the four data blocks have been together written to the CM 130 in the basic operations. However, in the third control, a data flush operation writes the data blocks individually into the CM 130 without the saving and recovery. Thereby, since a degree of the saving and recovering operations performed in the basic operations is reduced, the processing time necessary for performing the entire processings can be shortened.

The third control may be executed independently of the first and second controls or by a combination with them. Note that, in the cache write processing, the data is written to the CM 130 through the connection unit 150 from the data transfer LSI 114 of the CHA 110. Therefore, if consistency with the configurations of the connection unit 150 and the controller 100 causes no problem, it is advantageous to execute the third control.

Fourth Embodiment

Next, a storage apparatus 600 of a fourth embodiment will be described. The storage apparatus 600 of the fourth embodiment executes the fourth control for transferring the data.

<4: Fourth Control at Cache Read>

As the fourth control, a description will be made of the data transfer control for reducing saving/recovery at the cache read. As the fourth control, in executing the data transfer by the DMA unit 800, that is, when the plurality of pieces of data are read from the CM 130 to the memory #2 (113) to execute the read processing, namely, when the respective pieces of data, which is together read from the CM 130 to the buffer 801, are transferred, the data transfer LSI 114 once discards the pair of data transfer information and data stored in the register 807 or the buffer 810 without executing the saving or recovery to the memory #3 (115) and transfers the data to the memory #2 (113) by re-reading the transfer data from the CM 130 to the buffer 810 in the next data transfer. Note that the discarding is that no action is taken for the pair of the data transfer information and the data in the buffer 810 or that the pair is overwritten by another pair.

FIG. 18B is a timing chart showing a processing example of the fourth control. Note that FIG. 18B shows the case where the data {A1, B1, A2, B2, . . . } are transferred at the shortest timing.

The DMA-A is started for transferring the data A1 (t1), and the DMAC 801A consecutively reads the data A1 to A4 from the CM 130 to the buffer 810A (t2 to t5). Then, the data A1 is transferred from the buffer 810A to the memory #2 (113) (t3). Next, upon transfer of the data B1, the DMA-B is started (t3), and the data B1 to B4 are similarly transferred from the CM 130 to the buffer 310B (t4 to t7), and the data B1 is transferred from the buffer 310B to the memory #2 (113) (t5). Then, the DMA-A is started in the transfer of data A2 (t5). At this time, if the basic operations are performed, the pair stored in the memory is saved and the pairs (A2 to A4) of data transfer information and data necessary for transferring the data A2 are recovered. However, when the fourth control is executed, the DMA-A re-reads the data A2 to A4 from the CM 130 to the buffer 310A (t6 to t8) instead of recovering the pairs (A2 to A4) from the memory #3 (115) and then transfers the data A2 from the buffer 810A to the memory #2 (113) (t7). By using the data (A2 to A4) re-read from the CM 130, the transfer of data A2 is controlled. Similarly, in response to the transfer of the data B2 (t7), the DMA-B similarly re-reads the data B2 to B4 from the CM 130 (t8 to t10) and transfers the data B2 to the memory 2 (113) (t9). The transfers executed after the data A3 and B3 are also similar (t9 to t11, t11 to t13, t13 to t15, and t15 to t17).

Thus, in the basic operations, saving and recovery have been executed in the data transfer from the CM 130 to the memory #2 (113). However, in the fourth control, through the operations of discarding the pair stored in the memory of the DMA units 800 and of re-reading the transfer data from the CM 130, the respective data blocks are transferred to the memory #2 (113) without executing the saving and recovery whenever each of the data transfers is executed. Thereby, since the saving and recovering operations executed in the basic operations are reduced, the processing time required in the entire processings can be shortened.

The fourth control may be executed independently of the second and third controls or by a combination with them. Note that, in the cache read processing, reading the data from the CM 130 is executed through the connection unit 150 from the data transfer LSI 114 of the CHA 110. Therefore, similarly to the third control, if consistency with the configurations of the connection unit 150 and the controller 100 cause no problem, it is advantageous to execute the fourth control.

As described above, the embodiments of the invention made by the present inventors have been specifically described. However, needless to say, the present invention is not limited to the above embodiments and can be variously modified and altered without departing from the gist thereof.

The present invention can be used in an apparatus that multiprocess a plurality of data transfers or in an information processing system.

What is claimed is:

1. A storage apparatus having a controller receiving a data input/output request from an other apparatus and performing a data input/output processing to a storage volume on a storage unit, the storage apparatus comprising:
    said controller controlling a data transfer between the controller and said other apparatus to perform the data input/output processing and including:
        an input/output controller for controlling said data input/output processing;
        a data transfer controller for controlling said data transfer based on an instruction of said input/output controller;
        a first memory unit to be a transfer destination or transfer source in said data transfer; and
        a second memory unit for storing data transfer information to control said data transfer,
    wherein said data transfer controller includes:
        a data transfer circuit for controlling a DMA (Direct Memory Access) data transfer; and
        a communication interface unit having a communication interface with said other apparatus and performing a communication processing between said controller and said other apparatus, and
    wherein said data transfer circuit includes a plurality of DMA units each having a DMA controller, a register for storing said data transfer information, and a buffer for storing data to be transferred, and wherein said data transfer circuit includes means for performing processes of saving and recovering data transfer information, concurrently with performing processes of data transfer, while suppressing loads caused by said saving and recovering processes of the data transfer information, comprising means for making said register of one of said DMA units and its corresponding buffer perform a process of saving, into said second memory unit, data transfer information stored in said register of said one of said DMA units and data stored in said corresponding buffer and a processing of recovering the data transfer information and the data saved in said second memory unit, means for concurrently processing one or more data transfers by using said plurality of DMA units, means for processing said data transfers by using said saving and recovering processes in one of said DMA units while said data transfers are shifted, means for multiprocessing a plurality of data transfers, and means for executing control, concurrently with said processing of said one or more data transfers by said plurality of DMA units, for saving in advance, into said second memory unit, for future data transfer, the data transfer information stored in said register and the data stored in said buffer by using one of the DMA units not currently processing said data transfers, wherein in said data input/output processing of said controller, said input/output controller starts said data transfer controller by writing, into said second memory unit, the data transfer information including a data storage position in said first memory unit and a data storage position in said other apparatus in response to receipt of data from said other apparatus or a command from said controller,
    said started data transfer controller starts any of said plurality of DMA units, and
    said started DMA unit controls, based on said data transfer information read from said second memory unit to said register, data transfers between said first memory unit and a third memory unit of said communication interface unit through said buffer while the saving or recovering operation is performed by said DMA unit that is not currently processing said data transfers, and
        wherein said communication interface unit performs communication processing between said third memory unit and a fourth memory unit in said other apparatus.

2. The storage apparatus according to claim 1,
wherein the data transfer by said data transfer controller is controlled in a unit of each data block obtained by dividing data to be transmitted /received between said other apparatus and the storage apparatus.

3. The storage apparatus according to claim 1,
wherein said controller and said other apparatus are communicably connected through one or more switches, and
said communication interface unit executes the data transfer through said switch in a unit of respective data blocks obtained by dividing objective data to be transmitted/received between said other apparatus and the storage apparatus.

4. The storage apparatus according to claim 1,
wherein said communication interface unit has a third memory unit used in the communication processing with said other apparatus, and
said one of said DMA units executes, in said data transfer, a data transfer between said first memory unit and said third memory unit.

5. The storage apparatus according to claim 1,
wherein said controller is configured so that a third memory, in which an individual control area for saving and recovering a pair of data transfer information stored in said register for each DMA unit and data stored in said buffer is provided, is connected to said data transfer circuit, and
each of said DMA units performs said saving or recovering operation for the control areas in said third memory.

6. The storage apparatus according to claim 1,
wherein said data transfer circuit cause a first DMA unit to execute a first data transfer based on the data transfer information,
said first DMA unit recovers said first data transfer information and the data from said second memory unit and executes said first data transfer by using this, and
concurrently with said first data transfer, a second DMA unit saves in advance the data transfer information and the data stored in said register and buffer into the second memory unit.

7. The storage apparatus according to claim 1,
wherein, in response to an instruction from said input/output controller and in consideration of said data input/output request and a status of the data transfer processing, said data transfer circuit selects preferentially one or more DMA unit not processed presently from said plurality of DMA units and thereby determines the one or more DMA unit for taking charge of said data transfer, and starts the data transfer in said determined one or more DMA unit.

8. The storage apparatus according to claim 1,
wherein said controller includes:
a channel controller provided with a first circuit board on which said input/output controller, said data transfer controller, and said second memory unit are formed;
a cache memory provided with a second circuit board on which said first memory is formed;
a disk controller provided with a third circuit board on which a circuit reading and writing data from said cache memory to a storage area in a storage volume of said storage unit is formed; and
a connection unit interconnecting said channel controller, cache memory, and disk controller, and
wherein said data transfer circuit controls a data transfer between said cache memory and a third memory of said communication interface unit through said buffer.

9. The storage apparatus according to claim 1,
wherein said input/output controller includes a first processor,
said second memory unit includes a first memory into which said first processor writes said data transfer information, and a third memory used by said DMA unit,
said communication interface unit is configured to have a second processor controlling communication with said other apparatus and a second memory storing data to be transferred between said other apparatus and the communication interface unit, and
in said data transfer, said DMA unit uses the data transfer information read from said first memory, utilizes said saving and recovery to said third memory, and executes a data transfer between said first memory unit and said second memory unit.

10. The storage apparatus according to claim 1,
wherein said input/output controller includes a first processor,
a second memory unit includes a first memory into which said first processor writes said data transfer information and a third memory used for said saving and recovery by said DMA unit,
said communication interface unit is configured by a protocol LSI (Large Scale Integrated Circuit) controlling communication with said other apparatus while data is stored in an internal memory, and
in said data transfer, said DMA unit use the data transfer information read from said first memory, utilizes said saving and recovery to said third memory, and executes a data transfer between said first memory unit and said internal memory of said protocol LSI.

11. The storage apparatus according to claim 1,
wherein, when a second data transfer is executed by said DMA unit and said second data transfer is a data input/output associated with the first data transfer having been previously executed in the DMA unit and data transfer information or data necessary for executing the second data transfer is stored in said saved register and buffer, the data transfer controller uses them to execute said second data transfer without said recovering operation.

12. The storage apparatus according to claim 11,
wherein in response to receipt of data from said other apparatus or a command from said controller and in the case where the data or command is a plurality of data transfers associated with said data input/output, said data transfer controller makes a same DMA unit take charge of the plurality of data transfers as continuously as possible, thereby executing said plurality of data transfers without said recovering operation.

13. The storage apparatus according to claim 8,
wherein in said data input/output processing, said controller processes the data transfer by using said saving or recovering operation in a normal time, and
in a processing of writing together a plurality of pieces of associated data into said cache memory from the buffer of said DMA unit, said data transfer controller exercises control of reading and writing to said cache memory without the saving and recovering operations to said second memory unit whenever each piece of data in the plurality of pieces of data is accumulated from a side of said other apparatus to the buffer of said DMA unit.

14. The storage apparatus according to claim 8,
wherein in said data input/output processing, said controller processes a data transfer by using said saving or recovering operation in a normal time, and
in a processing of reading together a plurality of pieces of associated data from said cache memory to the buffer of said DMA unit, said data transfer controller exercises control by using the data re-read from said cache memory without the saving or recovering operation to said second memory and transfers each piece of data in the plurality of pieces of data from the buffer of said DMA unit to a side of said other apparatus whenever it transfers each of the multiple data from the buffer of the DMA unit to the side of the other device.

15. A storage apparatus having a controller receiving a data input/output request from an other apparatus and performing a data input/output processing to a storage volume on a storage unit, the storage apparatus comprising:
said controller controlling a data transfer between said other apparatus and the controller to perform the data input/output processing, and including a first processor for controlling said data input/output processing, a data transfer controller for controlling said data transfer based on an instruction of said first processor, a cache memory to be a transfer destination or transfer source in said data transfer, a first memory storing data transfer information for controlling said data transfer written by said first processor, and a third memory adapted to be used by said data transfer controller,
wherein said data transfer controller includes a data transfer circuit for controlling a DMA (Direct Memory Access) data transfer and a communication interface unit provided with a communication interface with said other apparatus and performing a communication processing between said controller and said other apparatus, said communication interface unit includes a second processor for controlling communication with said other apparatus, and a second memory for storing data transferred between said other apparatus and the communication interface unit, said data transfer circuit includes a plurality of DMA units each having a DMA controller, a register for storing said data transfer information, and a buffer for storing data to be transferred, and wherein said data transfer circuit includes means for performing processes of saving and recovering data transfer information, concurrently with performing processes of data transfer, while suppressing loads caused by said saving and recovering processes of the data transfer information, comprising means for making one of said DMA units execute the data transfer between said cache memory and said second memory by using an operation of saving, to said third memory, data transfer information stored in said register and data stored in said buffer and an operation of recovering the data transfer information and the data saved in said third memory to said register and said buffer, in accordance with the data transfer information read from said first memory, and said data transfer controller uses said plurality of DMA units to concurrently process one or more data transfers, uses said saving or recovering operation even in one of said DMA units to process said data transfer while the data transfers are switched, multiprocesses the plurality of data transfers, and executes control, concurrently with said processing of said one or more data transfers by said plurality of DMA units, for saving in advance, for future data transfer, into said third memory, the data transfer information stored in said register and the data stored in said buffer by one or more of said DMA units not currently processing said data transfer, and
wherein in said data input/output processing of said controller, said input/output controller starts said data transfer controller by writing, into said first memory, the data transfer information including a data storage position in said first memory unit and a data storage position in said other apparatus in response to receipt of data from said other apparatus or a command from said controller, said started data transfer controller starts any of said plurality of DMA units, and said started DMA unit controls, based on said data transfer information read from said first memory unit to said register, data transfers between said cache memory and a second memory unit of said communication interface unit through said buffer while the saving or recovering operation is performed by said DMA unit that is not currently processing said data transfers, and
wherein said communication interface unit performs communication processing between said second memory and a fourth memory in said other apparatus.

16. A storage apparatus including a storage system having a first storage apparatus provided with a first controller for receiving a data input/output request from an information processor and performing a data input/output processing to a first storage volume on a storage unit, and a second storage apparatus provided with a second controller communicably connected to said first controller and executing a data input/output processing to a second storage volume on the storage unit, the storage apparatus comprising:

said first controller controlling a data transfer between said information processor or second controller that is an other apparatus and the first controller to perform the data input/output processing to said first or second storage volume and includes:
an input/output controller for controlling said data input/output processing;
a data transfer controller for controlling said data transfer based on an instruction of said input/output controller;
a first memory unit to be a transfer destination or a transfer source in said data transfer; and
a second memory unit storing data transfer information for controlling said data transfer,
wherein said data transfer controller includes:
a data transfer circuit for controlling a DMA (Direct Memory Access) data transfer; and
a communication interface unit provided with a communication interface with said other apparatus and performing a communication processing between said controller and said other apparatus, and
wherein said data transfer circuit includes a plurality of DMA units each having a DMA controller, a register for storing said data transfer information, and a buffer for storing data to be transferred, and wherein said data transfer circuit includes means for performing processes of saving and recovering data transfer information, concurrently with performing processes of data transfer, while suppressing loads caused by said saving and recovering processes of the data transfer information, comprising means for making said register of one of said DMA units and it's corresponding buffer perform a process of saving, into said second memory unit, data transfer information stored in said register of said one of said DMA units and data stored in said corresponding buffer and a processing of recovering the data transfer information and the data saved in said second memory unit, means for concurrently processing one or more data transfers by using said plurality of DMA units, means for processing said data transfers by using said saving and recovering processes in one of said DMA units while said data transfers are shifted, means for multiprocessing a plurality of data transfers, and means for executing control, concurrently with said processing of said one or more data transfers by said plurality of DMA units, for saving in advance, into said second memory unit, for future data transfers, the data transfer information stored in said register and the data stored in said buffer by using one of the DMA units not currently processing said data transfers, and
wherein in said data input/output processing of said controller, said input/output controller starts said data transfer controller by writing, into said second memory unit, the data transfer information including a data storage position in said first memory unit and a data storage position in said other apparatus in response to receipt of data from said other apparatus or a command from said controller, said started data transfer controller starts any of said plurality of DMA units, and said started DMA unit controls, based on said data transfer information read from said second memory unit to said register, data transfers between said first memory unit and a third memory unit of said communication interface unit through said buffer while the saving or recovering operation is performed by said DMA unit that is not currently processing said data transfers, and wherein said communication interface unit performs communication processing between said third memory unit and a fourth memory unit in said other apparatus.

17. The storage apparatus according to claim 16, wherein, upon receipt of a data input/output request to the second storage volume in said second storage apparatus from an information processor that comprises said other apparatus, said input/output controller writes, to said second memory unit, the data transfer information controlling a data transfer for performing the data input/output processing to said second storage apparatus in accordance with the reception, and based on said data transfer information read to said register from said second memory unit, said data transfer controller controls the data transfer between said first memory unit and said second controller.

18. The storage apparatus according to claim 16, wherein, upon receipt of a data write request and write data to said first storage volume from the information processor that is said other apparatus, said input/output controller writes, to said second memory unit, the data transfer information for controlling the data transfer for performing the data write processing to said first storage volume and the processing of also writing a duplication of said write data into said second storage volume in said second storage apparatus in accordance with the reception, and based on said data transfer information read from said second memory unit to said register, said data transfer controller controls the data transfer including a transfer of said write data between said first memory unit and said second controller.

* * * * *